(12) United States Patent
Sun

(10) Patent No.: US 12,160,170 B2
(45) Date of Patent: Dec. 3, 2024

(54) POWER FACTOR CORRECTION SYSTEM

(71) Applicant: TEXAS INSTRUMENTS INCORPORATED, Dallas, TX (US)

(72) Inventor: Bosheng Sun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 222 days.

(21) Appl. No.: 17/728,856

(22) Filed: Apr. 25, 2022

(65) Prior Publication Data

US 2023/0344335 A1    Oct. 26, 2023

(51) Int. Cl.
*H02M 1/42*    (2007.01)
*H02M 1/00*    (2006.01)
*H02M 1/08*    (2006.01)

(52) U.S. Cl.
CPC ....... *H02M 1/4225* (2013.01); *H02M 1/0009* (2021.05); *H02M 1/08* (2013.01); *H02M 1/4266* (2013.01)

(58) Field of Classification Search
CPC .... H02M 1/42; H02M 1/4208; H02M 1/4216; H02M 1/4225; H02M 1/4233; H02M 1/4258; H02M 1/4266; H02M 1/0003; H02M 1/0009; H02M 1/0012; H02M 1/0016; H02M 1/0022; H02M 1/0025; H02M 1/0029; H02M 1/08; H02M 1/0081; H02M 1/0082; H02M 3/02; H02M 3/04; H02M 3/10; H02M 3/135; H02M 3/139; H02M 3/142; H02M 3/155; H02M 3/1552; H02M 3/156; H02M 3/157; H02M 3/158; H02M 3/1582; H02M 3/1588; H02M 7/02; H02M 7/04; H02M 7/12; H02M 7/162; H02M 7/1626; H02M 7/217; H02M 7/219;
(Continued)

(56) References Cited

U.S. PATENT DOCUMENTS

| 6,178,104 B1 * | 1/2001 | Choi | H02M 1/4225 363/81 |
| 2012/0051107 A1 * | 3/2012 | Choi | H02M 1/4208 363/126 |

(Continued)

OTHER PUBLICATIONS

J. Gegner et al. "Linear Peak Current Mode Control: a Simple Active Power Factor Correction Control Technique for Continuous Conduction Mode", IEEE, 1996, pp. 196-202. (Year: 1996).*
(Continued)

*Primary Examiner* — Thienvu V Tran
*Assistant Examiner* — Carlos O Rivera-Perez
(74) *Attorney, Agent, or Firm* — Charles F. Koch; Frank D. Cimino

(57) ABSTRACT

In some examples, an apparatus includes: a ramp generation circuit having a ramp control input and a ramp output, the ramp control input coupled to a power factor correction (PFC) output terminal; a comparator having a comparator output and first and second comparator inputs, the first comparator input coupled to the ramp output, the second comparator input coupled to a PFC switch current sensing terminal; and a pulse width modulation (PWM) generation circuit having a PWM control input and a PWM output, the PWM control input coupled to the comparator output, and the PWM output coupled to a PFC switch control terminal.

19 Claims, 14 Drawing Sheets

(58) Field of Classification Search
CPC ......... Y02B 70/00; Y02B 70/10; G05F 1/565; G05F 1/70
USPC ....... 363/41, 84, 89; 323/205–211, 222–226, 323/271–275, 280, 282–286, 299–303, 323/351
See application file for complete search history.

(56) References Cited

U.S. PATENT DOCUMENTS

2012/0293141 A1* 11/2012 Zhang ................. H02M 1/4233
323/207
2013/0027013 A1 1/2013 Lee et al.

OTHER PUBLICATIONS

Hwu, K.I., et al.: "Improvement of Nonlinear-Carrier Control for High-Power-Factor Boost Rectifiers," Power System Technology, 2006, Powercon 2006, International Conference on, IEEE, PI, Oct. 1, 2006 (Oct. 1, 2006), pp. 1-4, XP031053431, ISBN: 978-1-4244-0110-9 pp. 1-3.
Sebastian, J, et al.: "The Voltage-Controlled Compensation Ramp: A New Waveshaping Technique for Power Factor Correctors," Applied Power Electronics Conference and Exposition, 2008, APEC 2008, Twenty-Third Annual IEEE, IEEE, Piscataway, NJ, USA, Feb. 24, 2008 (Feb. 24, 2008), pp. 722-728, XP031253327, ISBN: 978-1-4244-1873-2, Section III.
PCT Search Report dated Jul. 17, 2023.

* cited by examiner

POWER FACTOR CORRECTION SYSTEM

BACKGROUND

A power supply system can transfer electric power from an alternating current (AC) source to a load. The power supply system can rectify an AC voltage to generate a direct current (DC) voltage. The power supply system can also include a power converter, such as a switch mode power converter, to regulate the DC voltage at a target DC voltage, and provide the regulated DC voltage to the load. The power supply system may employ various techniques to improve the electric power transfer, such as reducing the phase delay between an AC current drawn from the AC source and the AC voltage, and reducing the power loss during the switching of the power converter.

SUMMARY

An apparatus includes a ramp generation circuit, a comparator, and a pulse width modulation (PWM) generation circuit. The ramp generation circuit has a ramp control input and a ramp output, the ramp control input coupled to a power factor correction (PFC) output terminal. The comparator has a comparator output and first and second comparator inputs, the first comparator input coupled to the ramp output, the second comparator input coupled to a PFC switch current sensing terminal. The PWM generation circuit has a PWM control input and a PWM output, the PWM control input coupled to the comparator output, and the PWM output coupled to a PFC switch control terminal.

An apparatus includes a power factor correction (PFC) circuit, a current measurement circuit, a voltage measurement circuit, and a controller. The PFC circuit has a PFC input and a PFC output, the PFC circuit including an inductor, a switch, and a diode, the inductor coupled between the PFC input and a current terminal of the switch, and the diode coupled between the current terminal and the PFC output. The current measurement circuit is magnetically coupled to the current terminal and having a current measurement output. The voltage measurement circuit is coupled to the PFC output and having a voltage measurement output. The controller has a first control input, a second control input, and a control output, the first control input coupled to the current measurement output, the second control input coupled to the voltage measurement output, and the control output coupled to a control terminal of the switch. The controller further includes a ramp generation circuit, a comparator, and a PWM generation circuit. The ramp generation circuit has a ramp control input coupled to the second control input, and a ramp output. The comparator has a comparator output and first and second comparator inputs, the first comparator input coupled to the ramp output, the second comparator input coupled to the first control input. The PWM generation circuit has a PWM control input and a PWM output, the PWM control input coupled to the comparator output, and the PWM output coupled to the control output.

A method comprises: receiving a first voltage from an output of a power factor correction (PFC) circuit, determining a first ramp voltage for a ramp signal based on the first voltage, and generating the ramp signal that decreases from the first ramp voltage to a second ramp voltage. The method further comprises providing a pulse width modulation (PWM) signal having a first state to a control terminal of a switch of the PFC circuit. The method further comprises: receiving a second voltage representing a current through a switch of the PFC circuit when the PWM signal is in the first state, and comparing the second voltage and the ramp signal to generate a decision. The method further comprises responsive to the decision indicating that the second voltage intersects the ramp signal, switching the PWM signal from the first state to a second state to disable the switch.

DETAILED DESCRIPTION

Figure 1:
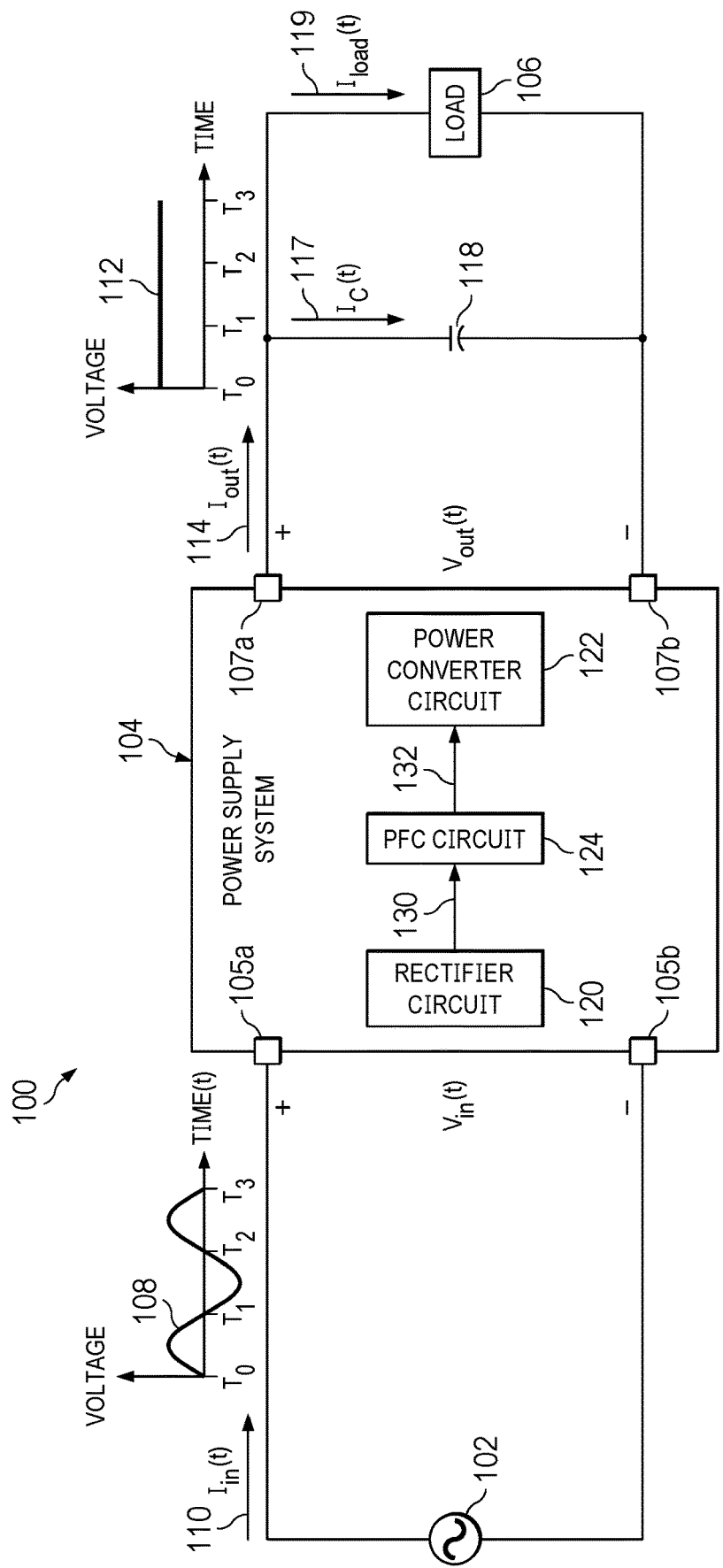
FIG. 1 is a schematic diagram of an example electric power transfer system.

FIG. 1 is a schematic diagram of an example electric power transfer system 100. System 100 may include an AC power source 102, a power supply system 104, and a load 106. Power supply system 104 can include a positive input 105a, a negative input 105b, a positive output 107a, and a negative output 107b. AC power source 102 can provide an AC input voltage signal 108 (labelled $V_{in}(t)$) across positive input 105a and negative input 105b. AC input voltage signal 108 can have positive half-cycles when the voltage signal is positive (e.g., between $T_0$ and $T_1$ and between $T_2$ and $T_3$) and negative half-cycles when the voltage signal is negative (e.g., between $T_1$ and $T_2$). In the positive half-cycles, positive input 105a can receive a higher voltage than negative input 105b, and in the negative half-cycles, the polarities are reversed and positive input 105a can receive a lower voltage than negative input 105b. An AC input current signal 110 (labelled $I_{in}(t)$) can also flow into positive input 105a and return back to AC power source 102 from negative input 105b in the positive half-cycles of AC input voltage signal 108. The AC input current signal can also flow into negative input 105*b* and return back to AC power source 102 from positive input 105*a* in the negative half-cycles of AC input voltage signal 108.

From AC input voltage signal 108, power supply system 104 can generate a DC output voltage signal 112 (labelled $V_{out}(t)$) across positive output 107*a* and negative output 107*b*. Positive output 107*a* can provide a positive power supply rail, and negative output 107*b* can provide a negative power supply rail. Power supply system 104 can supply DC output voltage signal 112 to load 106, which can include electronic components that operate on a DC voltage. Power supply system 104 can also provide an DC output current signal 114 (labelled $I_{out}(t)$), which can flow out of positive output 107*a*, through load 106, and return back to negative output 107*b*. System 100 can include a capacitor 118 to perform a filtering operation to reduce the ripples in DC output voltage signal 112 and DC output current signal 114. DC output current signal 114 can be split into a capacitor current signal 117 (labelled $I_C(t)$) that flows through capacitor 118 and a load current signal 119 (labelled $I_{load}(t)$) that flows through load 106. DC output current signal 114, capacitor current signal 117, and load current signal 119 can be related by the following Equation:

$$I_{out}(t)=I_C(t)+I_{load}(t) \quad \text{(Equation 1)}$$

To generate DC output voltage signal 112 from AC input voltage signal 108, power supply system 104 can include a rectifier circuit 120 and a power converter circuit 122. Rectifier circuit 120 can perform a rectification operation to convert AC input voltage signal 108 to a DC input voltage signal 130. As part of the rectification operation, rectifier circuit 120 can pass the positive voltages of AC input voltage signal 108 during the positive half cycles as the DC input voltage signal 130. Rectifier circuit 120 can also block the negative voltages of AC input voltage signal 108 during the negative half cycles in a half-wave rectification operation, or convert the negative voltages to positive voltages in a full-wave rectification operation, and generate a pulsating DC input voltage signal 130. Power converter circuit 122 can then generate DC output voltage signal 112 from DC input voltage signal 130 based on a conversion ratio. In a case where power converter circuit 122 is a step-up converter (e.g., a boost converter), the conversion ratio can be higher than one, and DC output voltage signal 112 can become higher than DC input voltage signal 130. In a case where power converter circuit 122 is a step-down converter (e.g., a buck converter), the conversion ratio can be lower than one, and DC output voltage signal 112 can become lower than DC input voltage signal 130.

In addition to generating DC output voltage signal 112, power converter circuit 122 may include a power factor correction (PFC) circuit 124 to perform a PFC operation. PFC circuit 124 can receive DC input voltage signal 130 and generate a PFC output voltage signal 132, which can then be converted to DC output voltage signal 112 by power converter circuit 122. Power factor (PF) can be defined as a ratio of the real power measured in watts (W) consumed by load 106 divided by the total apparent power measured in volt-amperes (VA) circulating between AC power source 102 and load 106. A high PF (e.g., close to or equal one) can indicate that a large percentage of the power supplied by AC power source 102 (apparent power) is delivered to and consumed by load 106. The PFC operation can be performed to increase the PF up to one.

PF can be given by a phase relationship φ between AC input voltage signal 108 and AC input current signal 110, and an amount of total harmonic distortion (THD) present in the AC input current signal, according to the following Equation:

$$PF = \frac{\cos(\varphi)}{\sqrt{1+THD^2}} \quad \text{(Equation 2)}$$

Figure 2:
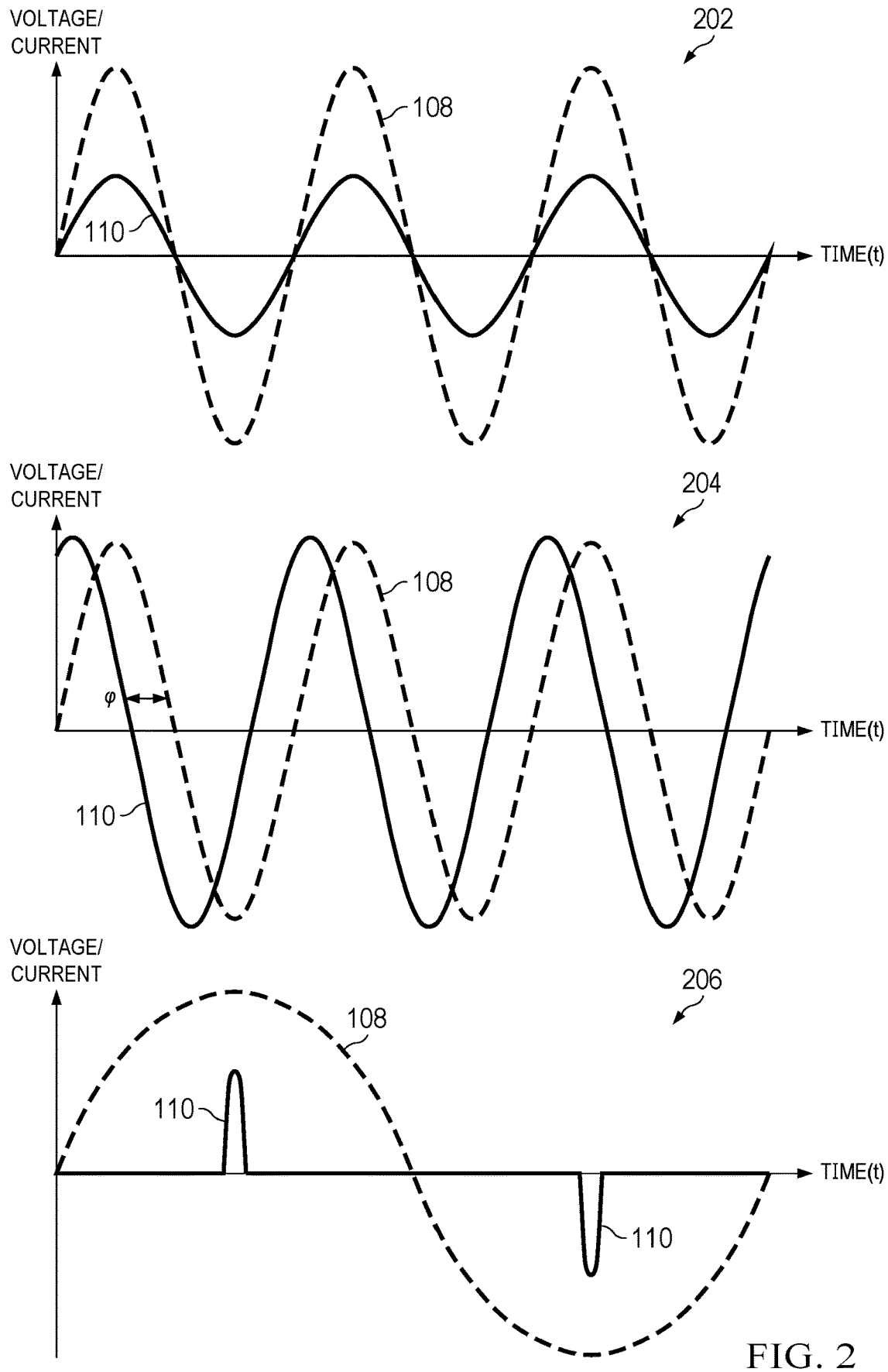
FIG. 2 are waveform diagrams that illustrate examples of input voltage and input current of the electric power transfer system of FIG. 1.

FIG. 2 illustrates charts 202, 204, and 206 of examples of AC input voltage signal 108 and AC input current signal 110, where AC input voltage signal 108 includes a sinusoidal signal having a fundamental frequency. In chart 202, AC input voltage signal 108 and AC input current signal 110 has a zero phase difference, which can lead to a PF of one. In chart 204, AC input voltage signal 108 and AC input current signal 110 has a phase difference of φ, and the PF can become lower than one. Also, in chart 206, AC input current signal 110 includes pulses and is not sinusoidal. The AC input current signal 110 may have substantial THD, and the PF can become lower than one. The THD can reduce the spectral component of AC input current signal 110 associated with the fundamental frequency.

Referring to chart 202 of FIG. 2, in a case where PF equals one, the maxima of AC input current signal 110 and AC input voltage signal 118 can coincide. Accordingly, the amount of power transferred from AC power source 102 to load 106 can be increased compared a case where PF is lower than one, such as the examples of AC input current signal 110 and AC input voltage signal 118 illustrated in charts 204 and 206. Also, a high PF can indicate reduced harmonic distortion (e.g., reduced THD) in AC input current signal 110. Because harmonic distortion can reduce the spectral component of AC input current signal 110 associated with the fundamental frequency of AC input voltage signal 108, reducing the harmonic distortion can also increase the amount of power transferred from AC power source 102 to load 106.

Figure 3:
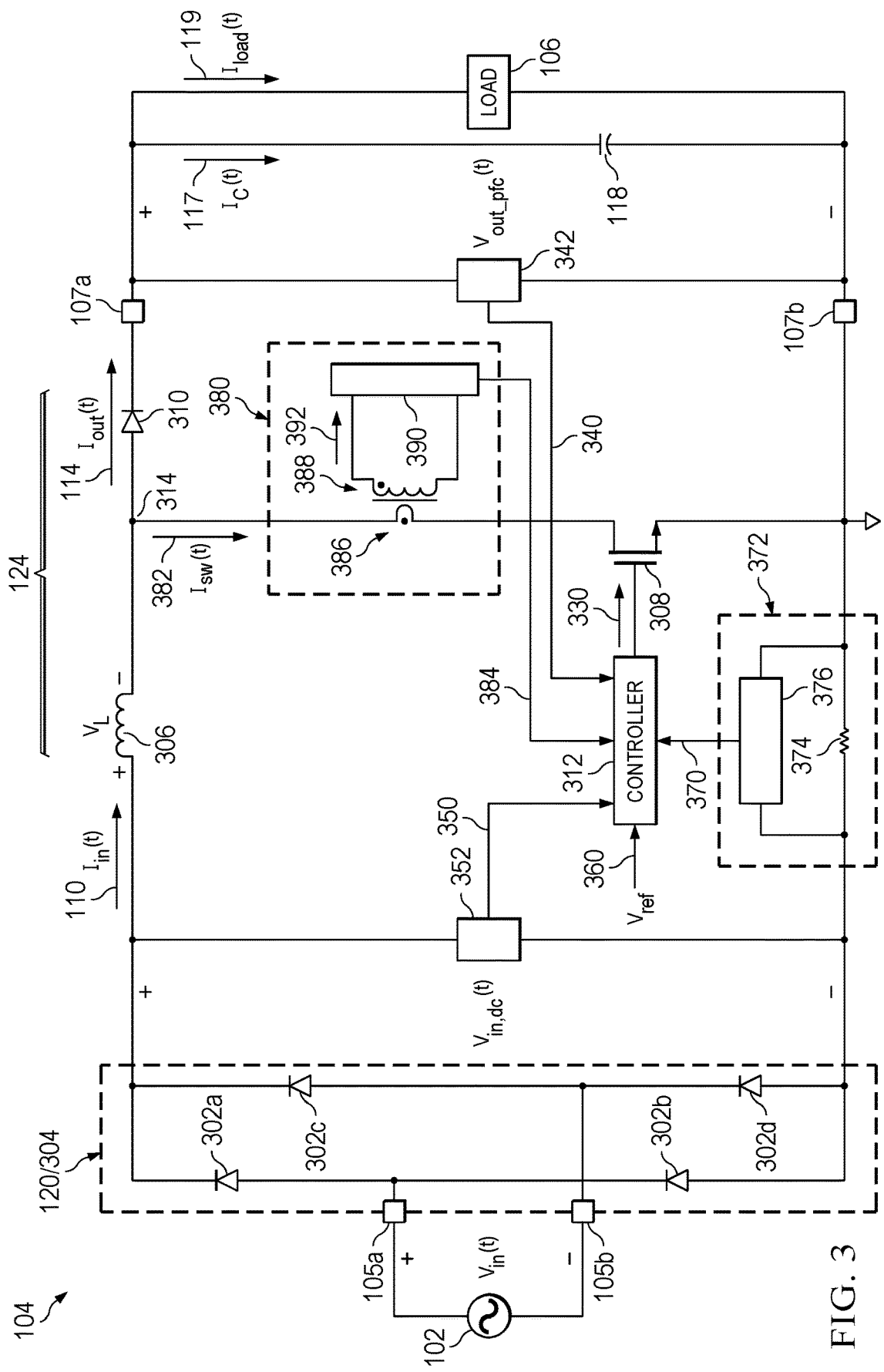
FIG. 3 is a schematic diagram of an example power supply system including a power factor correction (PFC) circuit that can be part of the electric power transfer system of FIG. 1.

FIG. 3 is a schematic diagram of an example power supply system 104 including rectifier circuit 120 and PFC circuit 124. Referring to FIG. 3, power supply system 104 can include diodes 302*a*, 302*b*, 302*c*, and 302*d* coupled between positive input 105*a* and negative input 105*b* forming a diode bridge 304. Diode bridge 304 can be part of rectifier circuit 120 and can perform a full-wave rectification operation to generate a pulsating DC input voltage signal 130 from AC input voltage signal 108. Also, PFC circuit 124 can include an inductor 306, a switch 308, and a diode 310, and can be coupled to a controller 312 that controls switch 308. Inductor 306, switch 308, and diode 310 can be coupled at a node 314, and switch 308 can be coupled between node 314 and negative output 107*b*. The voltage of node 314 can switch between the positive and negative power supply rails within a switching cycle and can be a switching node. In FIG. 3, negative output 107*b* can be coupled to a ground. In other examples, negative output 107*b* can be coupled to a low impedance voltage source to provide a reference voltage and to provide a return path for DC output current signal 114.

Inductor 306, switch 308, and diode 310 can be part of PFC circuit 124. Switch 308 can control the flow of AC input current signal 110 through inductor 306 to store magnetic energy in the inductor. Diode 310 can operate as a rectifier. When switch 308 is disabled, and the voltage of node 314 becomes higher than output voltage $V_{out}(t)$, diode 310 can be forward biased. Inductor 306 can discharge, and the forward-biased diode 310 allows the discharge current to flow to load 106. Also, when switch 308 is enabled, node 314 voltage can become lower than output voltage $V_{out}(t)$, and diode 310 can be reverse biased and block the flow of current from load 106 back to inductor 306. Inductor 306 can charge, and the inductor current can flow through enabled switch 308. Switch 308 can include a transistor, such as a silicon field effect transistor (FET), or a gallium nitride (GaN) high electron mobility transistor (HEMT). In some examples, power system 104 can include another transistor configured as a synchronous rectifier (SR) switch, and the body diode of that transistor can be diode 310. The transistor can be enabled if switch 308 is disabled, and vice versa.

Controller 312 can generate control signal 330 to enable/disable switch 308 in each switching cycle. Control signal 330 can be in the form of a multi-cycle a pulse width modulation (PWM) signal. Each cycle of the PWM signal can have a pulse in which the PWM signal is in a first state to enable switch 308, and in the remainder of the cycle the PWM signal is in the second state to disable switch 308. In a case where switch 308 is an NFET, the first state can be an asserted state (e.g., logical one), and the second state can be a deasserted state (e.g., logical zero). Also, in a case where power supply system 104 includes an SR switch, controller 312 can also generate a control signal (not shown in the figures) for the SR switch having opposite states from control signal 330.

Controller 312 can receive measurement signals 340 of PFC output voltage signal 132 ($V_{out\_pfc}(t)$) from a voltage measurement circuit 342, measurement signals 350 of DC input voltage signal 130 ($V_{in,dc}(t)$) output by rectifier circuit 120 from a voltage measurement circuit 352, and a reference PFC output voltage signal 360 (also labelled $V_{ref}$ in FIG. 3). In some examples, voltage measurement circuit 342 can be coupled to a feedback network that generates a scaled version of PFC output voltage signal 132, and measurement signals 340 can represent the scaled version. Also, controller 312 can receive measurement signals 370 of AC input current signal 110 from a current measurement circuit 372. In FIG. 3, current measurement circuit 372 can include a shunt resistor 374 coupled across a return path of AC input current signal 110 to generate a voltage signal that reflects the magnitude of current signal 110. Current measurement circuit 372 can also include a measurement circuit 376 to generate measurement signals 370.

In some examples, power supply system 104 can also include a current measurement circuit 380 magnetically coupled to a current terminal of switch 308. Current measurement circuit 380 can be part of or external to PFC circuit 124, and can measure a switch current signal 382 (labelled $I_{sw}(t)$ in FIG. 3) that flows through switch 308, and generate a measurement signal 384 of switch current signal 382. Current measurement circuit 380 can include a current transformer (CT) sensor, which can include a primary coil 386 coupled between node 314 and a current terminal of switch 308, a secondary coil 388 magnetically coupled to primary coil 386, and a measurement circuit 390. When switch 308 is enabled, the inductor current (and AC input current signal 110) increases with time and flows to switch 308 as switch current signal 382. Through magnetic coupling, a current signal 392 that tracks switch current signal 382 can be induced in secondary coil 388. Measurement circuit 390 can include circuits to measure current signal 392 to generate measurement signal 384. For example, measurement circuit 390 may include a resistor to convert current signal to a voltage signal, and provide the voltage signal as measurement signal 384.

In some examples, voltage measurement circuits 342 and 352, and current measurement circuit 372 and 380 can include sampling-and-hold (S/H) circuits to generate samples of the voltage signals. In some examples, these circuits can also include analog-to-digital converters (ADCs) to convert the sampled voltage signals to digital values.

Controller 312 can implement a voltage feedback loop, in which controller 312 can adjust control signal 330 based on measurement signals 340 and 350 and $V_{ref}$ to reduce a voltage difference between PFC output voltage signal 132 and $V_{ref}$. Also, controller 312 can implement a current feedback loop, in which controller 312 can adjust control signal 330 based on measurement signals 370 or measurement signals 384 to reduce a phase difference between AC input voltage signal 108 and AC input current signal 110 and to reduce harmonic distortions in AC input current signal 110, to improve PF.

Figure 4:
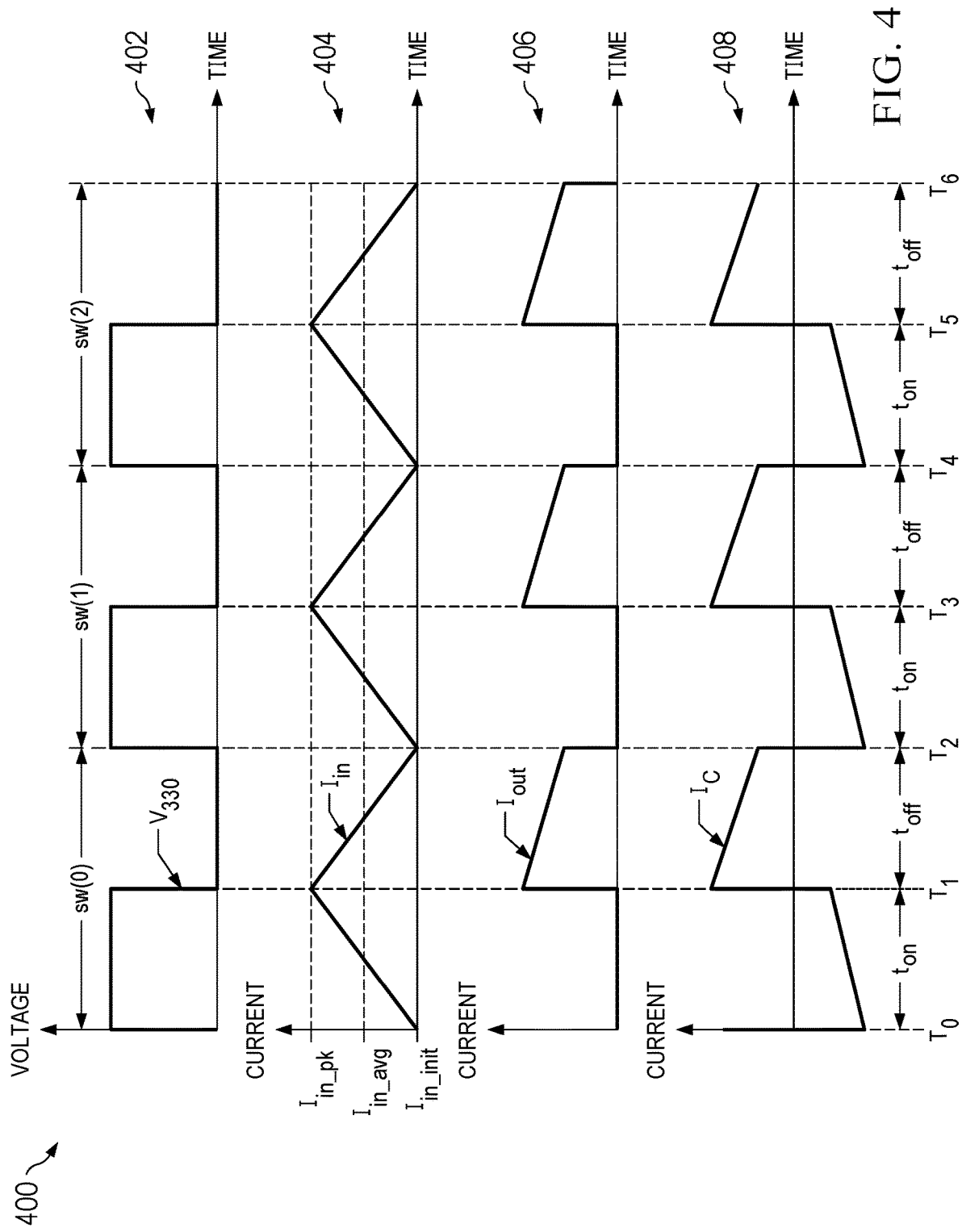
FIG. 4 and FIG. 5 include waveform diagrams that illustrate example PFC operations of the power supply system of FIG. 3.

FIG. 4 includes waveform diagrams that illustrate example operations of PFC circuit 124 of FIG. 3. FIG. 4 includes graphs 402, 404, 406, and 408. Graph 402 illustrates the time variation of control signal 330 across multiple switching cycles, including switching cycles sw(0), sw(1), and sw(2). Graph 404 illustrates the time variation of AC input current signal 110 ($I_{in}$) across the multiple switching cycles. Also, graph 406 illustrates the time variation of current through diode 310 ($I_{out}$), and graph 408 illustrates the time variation of current through capacitor 118 ($I_C$).

A first switching cycle (sw(1)) starts at time $T_0$. At $T_0$, the inductor current and AC input current can be at a value $I_{in\_init}$. As to be described below, depending on a type of PFC operation supported by controller 312, $I_{in\_init}$ can be zero or can have a positive value. Between $T_0$ and $T_1$ can be a first charging interval, in which controller 312 can provide a pulse having the first state for control signal 330. With switch 308 enabled, the voltage of node 314 can be brought to close to ground and is below output voltage $V_{out}$, diode 310 is reverse-biased and can prevent current from flowing from load 106/capacitor 118 back to switch 308 and ground. Accordingly, between $T_0$ and $T_1$ the current through diode 310 ($I_{out}$) can be at zero. Also, capacitor 118 can discharge to supply the load current $I_{load}$ to load 106, therefore the capacitor current $I_C$ can be negative.

Also, between $T_0$ and $T_1$, an increasing positive charging current can flow from inductor 306 through switch 308 to ground and charge inductor 306. The voltage across inductor 306, labelled $V_L$ in FIG. 3, can be equal to DC input voltage signal 130 ($V_{in,dc}$). With inductor 306 having an inductance L, the inductor current $I_L$, which can be equal to AC input current signal 110 ($I_{in}(t)$ from AC power source 102, can increase based on the following Equation:

$$\frac{dI_L}{dt} = \frac{V_L}{L} = \frac{V_{in,dc}}{L} \qquad \text{(Equation 3)}$$

In Equation 3, because DC input voltage signal 130 ($V_{in,dc}$) is positive, the slope of inductor current $dI_L/dt$ is also positive, and the inductor current increases between times $T_0$ and $T_1$. The switch current $I_{sw}$ through switch 308 can be equal to the inductor current IL during $t_{on}$. The positive inductor current can peak at time $T_1$. The duration between times $T_0$ and $T_1$ can be equal to $t_{on}$, which equals the pulse width of control signal 330 in switching cycle sw(0) and represents the charging interval in which switch 308 is enabled Within switching cycle sw(0), a positive peak inductor current (labelled $I_{in\_pk}$ in FIG. 4) at time $T_1$ can be related to $V_{in,dc}$, $t_{on}$, and $I_{in\_init}$ based on the following Equation:

$$I_{in\_pk} = I_{in\_init} + \frac{V_{in,dc}}{L} \times t_{on} \quad \text{(Equation 4)}$$

Between $T_1$ and $T_2$ can be part of a discharging interval, in which controller 312 can end the pulse and set control signal 330 to the second state to disable switch 308. The duration between $T_1$ and $T_2$ can be equal to $t_{off}$. The disabling of switch 308 can disconnect inductor 306 from ground, and allow the voltage of node 314 to rise to a level close to output voltage $V_{out}$. The switch current $I_{sw}$ can become zero. Diode 310 can become forward biased. Inductor 306 can dissipate the stored magnetic energy to supply a discharging current to load 106 and capacitor 118, and the DC output current signal 114 ($I_{out}(t)$) can be equal to the inductor current, and can be split into the capacitor current $I_C(t)$ and the load current $I_{load}(t)$. With the voltage of switching node 314 at $V_{out\_pfc}$, the inductor voltage $V_L$ becomes $V_{in,dc} - V_{out\_pfc}$, and the rate of change of inductor current can become:

$$\frac{dI_L}{dt} = \frac{V_L}{L} = \frac{V_{in,dc} - V_{out\_pfc}}{L} \quad \text{(Equation 4)}$$

If $V_{in,dc}$ is lower than $V_{out\_pfc}$, $V_L$ can become negative, and inductor 306 is discharged to supply a current to load 106 and capacitor 118. The inductor current, as well as input current $I_{in}(t)$, can reduce linearly from the positive peak inductor current ($I_{in\_pk}$) between $T_1$ and $T_2$ due to negative $dI_L/dt$. Depending on the type of PFC operation, the inductor current may drop to a positive value, zero, or a negative value as the final inductor current of the first switching cycle, which can also be the initial inductor current $I_{in\_init}$ for the next switching cycle (e.g., sw(2)). The average inductor current within the first switching cycle sw(1) is labelled as $I_{in,avg}$ and can be based on peak inductor current $I_{in\_pk}$, the initial and final inductor currents of the first switching cycle, and the durations of charging and discharging of the inductor ($t_{on}$ and $t_{off}$). The inductor current can reach $I_{in\_init}$ at the end the first switching cycle.

The charging and discharging of inductor 306 can then repeat for subsequent switching cycles, including switching cycle sw(1) between $T_2$ and $T_4$ and switching cycle sw(2) between $T_4$ and $T_6$. In the example of FIG. 4, switching cycles sw(0), sw(1), and sw(2) can have the same durations of charging and discharging of the inductor ($t_{on}$ and $t_{off}$), the same peak inductor current $I_{in\_pk}$, same average inductor current $I_{in,avg}$, and the same initial inductor current $I_{in\_init}$.

Figure 5:
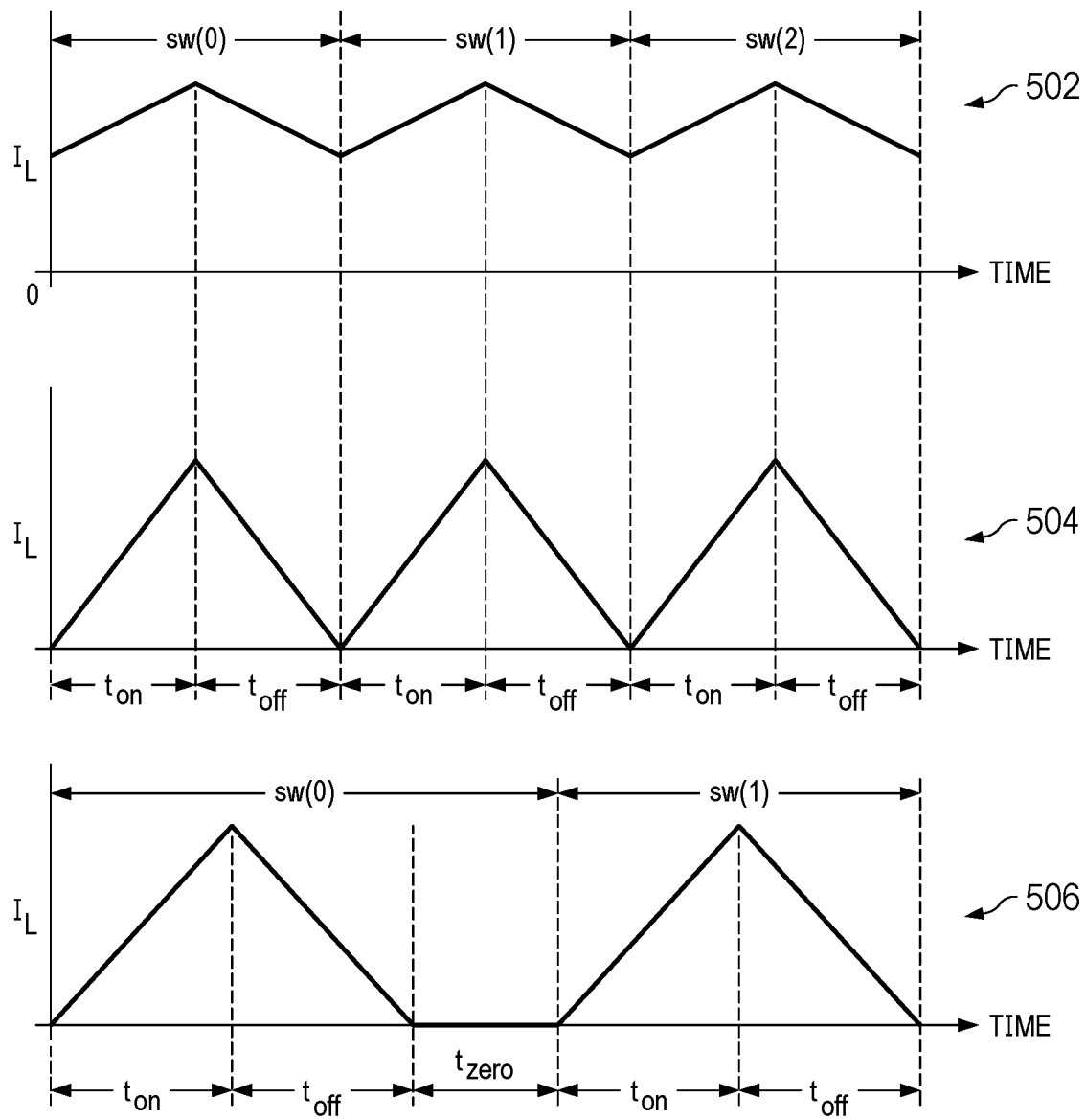

To perform a PFC operation, controller 312 can receive measurement signals 350 of DC input voltage signal 130 ($V_{in,dc}(t)$) in a switching cycle, and adjust $t_{on}$ and/or $t_{off}$ of that switching cycle based on measurement signals 350 to adjust the peak inductor current $I_{in\_pk}$ and the average inductor current $I_{in,avg}$, so as to reduce THD and the phase difference between AC input current signal 110 ($I_{in}$) and AC input voltage signal 108 ($V_{in}$) and to increase PF. FIG. 5 includes graphs 502, 504, and 506 of time variations of inductor current ($I_L$) across switching cycles for different types of PFC operations. Graph 502 illustrates a continuous conduction mode (CCM) operation, graph 504 illustrates a critical conduction mode (CrCM) operation, and graph 506 illustrates a discontinuous conduction mode (DCM) operation.

Referring to graph 502, the initial and final inductor current of a switching cycle in a CCM operation can be non-zero. Controller 312 can measure the average inductor current, the input voltage, and the output voltage of a switching cycle, and adjust the pulse width of control signal 330 based on the measurements, so that the average inductor current can vary and follow the input voltage across the switching cycles. Accordingly, in CCM operation, each switching cycle can have a constant duration, and the charging period duration $t_{on}$ and duty cycle may vary across the switching cycles.

Also, referring to graph 504, the initial and final inductor current of a switching cycle in a CrCM operation can be zero. Controller 312 can measure the output voltage and set the charging period duration $t_{on}$ so that the output voltage is constant across the switching cycles. Controller 312 can also measure the inductor current, and start a new switching cycle and the charging period responsive to the inductor current dropping to zero. Accordingly, in CrCM operation, controller 312 can generate a PWM signal in which the pulse width (and charging period duration $t_{on}$) can be constant across the cycles. But the cycle period and $t_{off}$ may vary across the switching cycles, and the average inductor current may also vary according to the input voltage.

Moreover, referring to graph 506, the initial and final inductor current of a switching cycle in a DCM operation can be zero. In a DCM operation, in addition to $t_{on}$ and $t_{off}$, a switching cycle can also have a duration $t_{zero}$ in which the inductor current is zero. Controller 312 can measure the output voltage and set the charging period duration $t_{on}$ so that the output voltage is constant across the switching cycles. Controller 312 can also generate a PWM signal having a constant cycle period equal to a sum of $t_{on}$, $t_{off}$, and $t_{zero}$. If the peak inductor current varies across the switching cycles, the average inductor may also vary and follow the input voltage.

Figure 6:
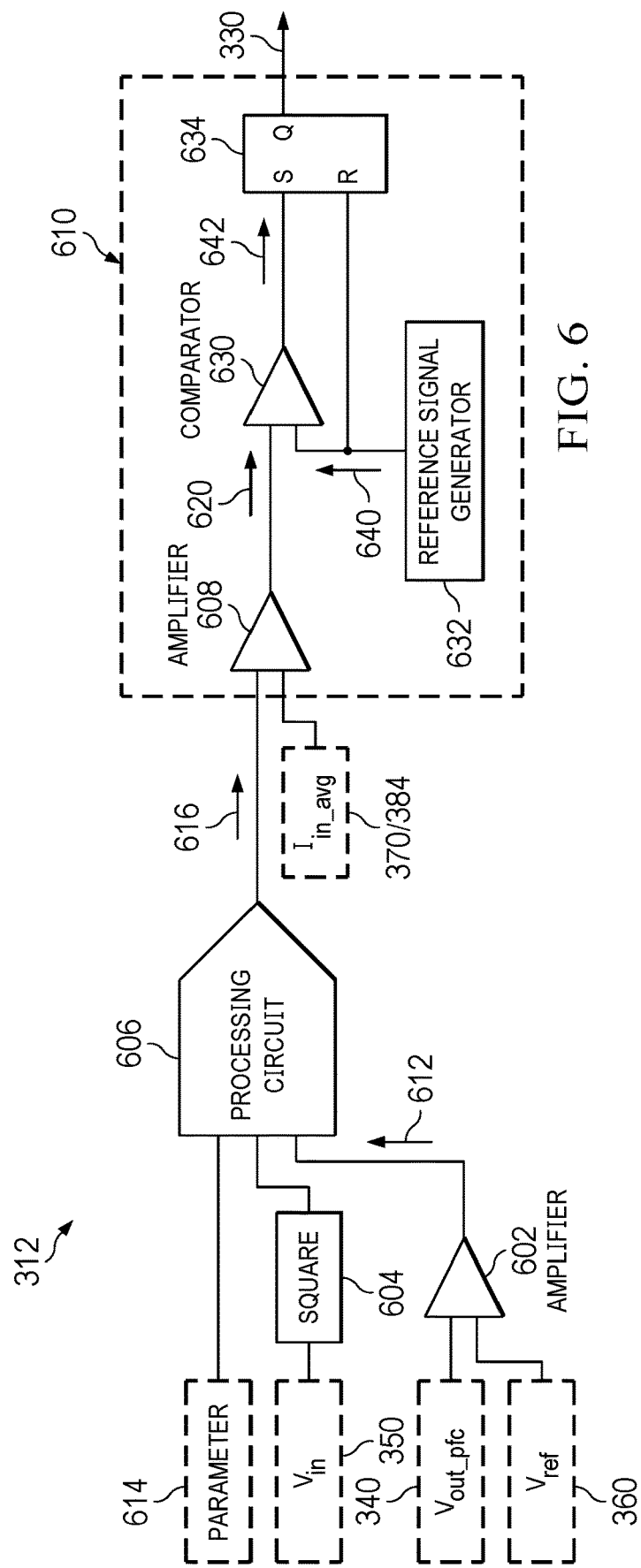
FIG. 6 is a schematic diagram of example internal components of a controller of the PFC circuit of FIG. 3.

FIG. 6 is a schematic diagram of controller 312. Controller 312 can implement a voltage feedback loop to adjust DC output voltage signal 112 based on reference DC output voltage signal 360, and a current feedback loop to adjust input current signal 110 based on AC input voltage signal 108 to improve PF. Referring to FIG. 6, controller 312 can include a first amplifier 602, a square generator circuit 604, a processing circuit 606, a second amplifier 608, and a PWM generation circuit 610. First amplifier 602 can be an error amplifier of the voltage feedback loop. First amplifier 602 can receive measurement signals 340 of PFC output voltage signal 132 ($V_{out\_pfc}$) and reference PFC output voltage signal 360 ($V_{ref}$), generate a voltage error signal 612 representing a difference between the DC output voltage (or a scaled version of it) and the reference voltage, and provide voltage error signal 612 to processing circuit 606. Also, square generator circuit 604 can receive measurement signals 350 of DC input voltage signal 130 ($V_{in,dc}$), generate a squared version of DC input voltage signal 130 (e.g., a root mean square (rms)) of the voltage signal), and provide the squared voltage signal to processing circuit 606. Voltage measurement circuits 342 and 352 can generate the respective measurement signals 340 and 350 by sampling the signals at any time within a switching cycle. Processing circuit 606 can also receive a parameter value 614. Processing circuit 606 can generate a reference current signal 616 based on the following Equation:

$$I_{ref} = \frac{C \times G(V_{out\_pfc}, V_{ref})}{(V_{in})^2} \quad \text{(Equation 6)}$$

In Equation 6, $I_{ref}$ represents reference current signal 616, G represents a voltage loop function implemented by first amplifier 602 to generate voltage error signal 612 based on the DC output voltage and the reference voltage, and C can represent parameter value 614. The reference current can include information of voltage error signal 612, based on which controller 312 can set the DC output voltage as part of the voltage feedback loop. The reference current can also include information of DC input voltage signal 130, based on which controller 312 can set the AC input current as part of the current feedback loop.

In some examples, processing circuit 606 can receive parameter value 614, squared version of DC input voltage signal 130, and voltage error signal 612 in the form of digital values, and compute a digital value of $I_{ref}$ based on Equation 6. Processing circuit 606 can include a digital-to-analog converter (DAC) to convert the digital value of $I_{ref}$ into an analog voltage signal, and provide the analog voltage signal to second amplifier 608. In some examples, processing circuit 606 can also receive parameter value 614, squared version of DC input voltage signal 130, and voltage error signal 612 in the form of analog voltage signals, and generate another analog voltage signal representing $I_{ref}$ from the received signals.

Second amplifier 608 can be an error amplifier of the current feedback loop. Second amplifier 608 can receive reference current signal 616 from processing circuit 606 and measurement signals 370 or 384 representing an average of AC input current signal 110 within a switching cycle ($I_{in\_avg}$). Current measurement circuit 372 can generate measurement signal 370 by sampling AC input current signal 110 at any time within a switching cycle. Also, current measurement circuit 380 can generate measurement signal 384 by sampling switch current signal 382 ($I_{sw}$) at the midpoint of a charging period ($t_{on}$) of a switching cycle to measure the average inductor current within a switching cycle, because switch current signal 382 is zero after the charging period ends where switch 308 is disabled. Second amplifier 608 can generate a current error signal 620 representing a difference between the average AC input current and the reference current, and provide current error signal 620 to PWM generation circuit 610.

PWM generation circuit 610 can generate control signal 330 and set the charging period duration ($t_{on}$) of a switching cycle based on current error signal 620. PWM generation circuit 610 can include a comparator 630, a reference signal generator 632, and a timing logic circuit 634. Reference signal generator 632 can generate a periodic ramp reference signal 640, and the period of reference signal 640 can define the cycle period of the switching cycles and of control signal 330. Comparator 630 can compare current error signal 620 against reference signal 640 to generate a decision signal 642. Timing logic circuit 634, which can include an SR latch, can generate control signal 330 as a PWM signal, and modulate the pulse width of the PWM signal based on the state of decision signal 642. Controller 600 may include a gate driver circuit (not shown in FIG. 6) to generate a drive signal for switch 308 responsive to control signal 330.

Figure 7:
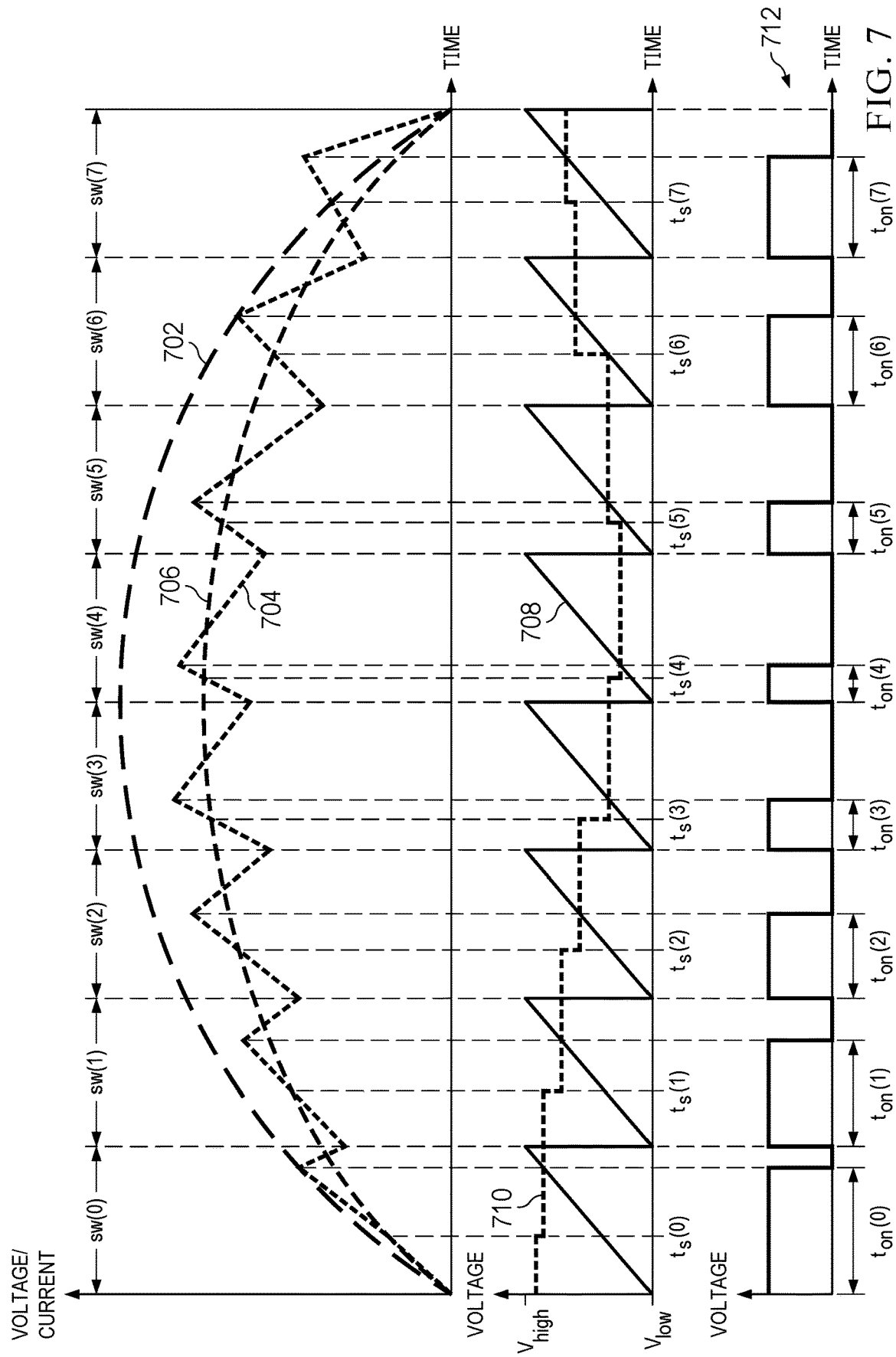
FIG. 7 includes waveform diagrams that illustrate example PFC operations supported by the example controller of FIG. 6.

FIG. 7 includes waveform diagrams that illustrate an example PFC operation of PFC circuit 124 under the control of controller 312 of FIG. 6. FIG. 7 includes graphs 702, 704, 706, 708, 710, and 712. Graph 702 illustrates the time variation of DC input voltage signal 130, which can be a sinusoidal signal in FIG. 7. Graph 704 illustrates the time variation of AC input current signal 110, which can also represent the inductor current of inductor 306. Graph 706 illustrates the time variation of average inductor current of each of switching cycles sw(0) through sw(7). Also, graph 708 illustrates the time variation of periodic ramp reference signal 640, and graph 710 illustrates the time variation of current error signal 620. Further, graph 712 illustrates the time variation of control signal 330. The example PFC operation illustrated in FIG. 7 can be a CCM operation.

Referring to graphs 708 and 710, at the beginning of switching cycle sw(0), reference signal 640 starts at a low voltage $V_{low}$ and increases to a high voltage $V_{high}$ at the end of sw(0). Reference signal 640 then drops back to $V_{low}$ at the beginning of the next switching cycle sw(1) and increases back to $V_{high}$ at the end of sw(1), according to a repetitive ramp pattern. Also, at the beginning of each switching cycle, reference signal 640 can be lower than current error signal 620, and comparator 630 can generate an asserted decision signal 642 to set the SR latch of timing logic circuit 634. In response to the SR latch being set, timing logic circuit 634 can generate an asserted control signal 330 to start the pulse. When reference signal 640 exceeds current error signal 620, comparator 630 can trip and generate a deasserted decision signal 642, which releases the set signal of the SR latch. Also, reference signal 640 can reset the SR latch. In response to the SR latch being reset, timing logic circuit 634 can generate a deasserted control signal 330 to stop the pulse and end the charging period duration $t_{on}$. Control signal 330 can remain deasserted for the remainder of the switching cycle, which corresponds to the discharging period duration $t_{off}$, until the start of the next switching cycle.

The charging period duration $t_{on}$ and the discharging period duration $t_{off}$ can reflect the magnitude of current error signal 620. Specifically, for a high current error signal 620, it can take a longer period of time for reference signal 640 to intersect and exceed current error signal 620. Accordingly, $t_{on}$ can increase and $t_{off}$ can decrease as current error signal 620 increases. Also, for a low current error signal 620, it can take a shorter period of time for reference signal 640 to intersect and exceed current error signal 620. Accordingly, $t_{on}$ can decrease and $t_{off}$ can increase as current error signal 620 decreases.

In each switching cycle, controller 312 can receive a measurement signal 340 of PFC output voltage signal 132 ($V_{out\_pfc}$), a measurement signal 350 of DC input voltage signal 130 ($V_{in,dc}$), a measurement signal 370 of AC input current signal 110, and reference PFC output voltage signal 360 ($V_{ref}$), and generate current error signal 620 for that switching cycle. Referring to FIG. 7, controller 312 may receive measurement signals 370 sampled at the midpoint of $t_{on}$ of each switching cycle. The inductor current sampled at the midpoint of $t_{on}$ of a switching cycle can be close to the average inductor current of the switching cycle. In the example shown in FIG. 7, controller 312 may receive the measurement signals at $t_s(0)$, $t_s(1)$, $t_s(2)$, $t_s(3)$, $t_s(4)$, $t_s(5)$, $t_s(6)$, and $t_s(7)$, which can be at the midpoint of, respectively, $t_{on}(0)$ of switching cycle sw(0), $t_{on}(1)$ of switching cycle sw(1), $t_{on}(2)$ of switching cycle sw(2), $t_{on}(3)$ of switching cycle sw(3), $t_{on}(4)$ of switching cycle sw(4), $t_{on}(5)$ of switching cycle sw(5), $t_{on}(6)$ of switching cycle sw(6), and $t_{on}(7)$ of switching cycle sw(7). In some examples, controller 312 can estimate the midpoint of $t_{on}$ of a current switching cycle (which is yet to be determined) based on $t_{on}$ of a prior current switching cycle. For example, controller 312 can determine the midpoint of $t_{on}$ of switching cycle sw(1)

based on the $t_{on}$ of switching cycle sw(0), in a case where the $t_{on}$ of consecutive switching cycles are almost equal.

Controller 312 can then determine current error signal 620 of a switching cycle based on the measurement signals sampled at the midpoint of $t_{on}$ of that switching cycle, and determine the $t_{on}$ (and the end of the pulse) of that switching cycle based on comparing the current error signal 620 with reference signal 640 of that switching cycle. With such arrangements, controller 312 can receive measurement signal 370 representing the average inductor current ($I_{in\_avg}$) of a switching cycle, generate current error signal 620 that reflects $I_{in\_avg}$ of that switching cycle, and adjust $t_{on}$ and $t_{off}$ of that switching cycle based on current error signal 620.

Power supply system 104 of FIG. 3, with controller 312 performing a CCM operation by sensing the average inductor current, can have an improved PF, but current measurement circuit 372 can introduce significant power loss in power supply system 104. Specifically, referring again to FIG. 3, current measurement circuit 372 includes shunt resistor 374 in the return path of the inductor current to measure the inductor current. But having the inductor current flowing through resistor 374 can lead to significant power loss (especially if the inductor current is large) and reduce the power efficiency of power supply system 104.

In contrast, current measurement circuit 380, which measures switch current signal 382 via magnetic coupling, can reduce power loss incurred in the current measurement operation and improve the power efficiency of power supply system 104. Specifically, current measurement circuit 380 measures switch current signal 382, which is zero during $t_{off}$ of a switching cycle since switch 308 is disabled. Accordingly, the average current that flows through primary coil 386 in a switch cycle is reduced compared with current measurement circuit 372, and the power loss contributed by the current measurement circuit can be reduced. The power loss can be further reduced by reducing a turn ratio between secondary coil 388 and primary coil 386, such that current signal 392 can become a scaled down version of switch current signal 382. Such arrangements can further reduce the average current that flows through measurement circuit 390 in a switch cycle and further reduce the power loss.

Also, sensing the inductor current via magnetic coupling can create an isolation boundary between the PFC circuit 124 from measurement circuit 390. PFC circuit 124 (e.g., inductor 306, switch 308, and diode 310 coupled at node 314) can be on the primary side of the isolation boundary (being coupled to primary coil 386), and measurement circuit 390 can be on the secondary side of the isolation boundary (being coupled to secondary coil 388). The isolation boundary can improve safety and prevent shorting between AC power source 102 (which can be on the primary side) and other electronic components that can be on the secondary side, such as power converter circuit 122 of FIG. 1.

Although current measurement circuit 380 can reduce power loss and improve safety, the sampling operation by current measurement circuit may be susceptible to timing uncertainties, which can introduce distortions and errors to the PFC operation. Specifically, as described above, current measurement circuit 380 may sample the switch current at the midpoint of the charging period of a switching cycle to measure the average inductor current in the switching cycle. But due to sampling time offset the switch current may not be sampled at exactly the midpoint of $t_{on}$, and measurement signal 384 may not represent exactly the average inductor current. Accordingly, current error signal 620 also may not represent the true difference between reference current signal 616 and the average inductor current in a switching cycle, and modulating $t_{on}$ based on current error signal 620 may introduce error components in the inductor current.

The sampling time offset can be contributed by various sources of timing uncertainties, such as jitters in clock signals provided to the sampling circuits. The sampling time offset may also vary across the switching cycles, and the magnitude of the error component caused by the sampling time offset may also vary across the switching cycles. Specifically, referring to FIG. 7, inductor current can increase at a higher rate in switching cycles with shorter $t_{on}$ (e.g., sw(4)) than switching cycles with longer $t_{on}$ (e.g., sw(0)). Accordingly, the same sampling time offset can lead to a larger error component in switching cycles with shorter $t_{on}$ than switching cycles with longer $t_{on}$. The varying error components can increase the harmonic distortion of the inductor current (and AC input current signal 110) and degrade the PF of power supply system 104.

Figure 8:
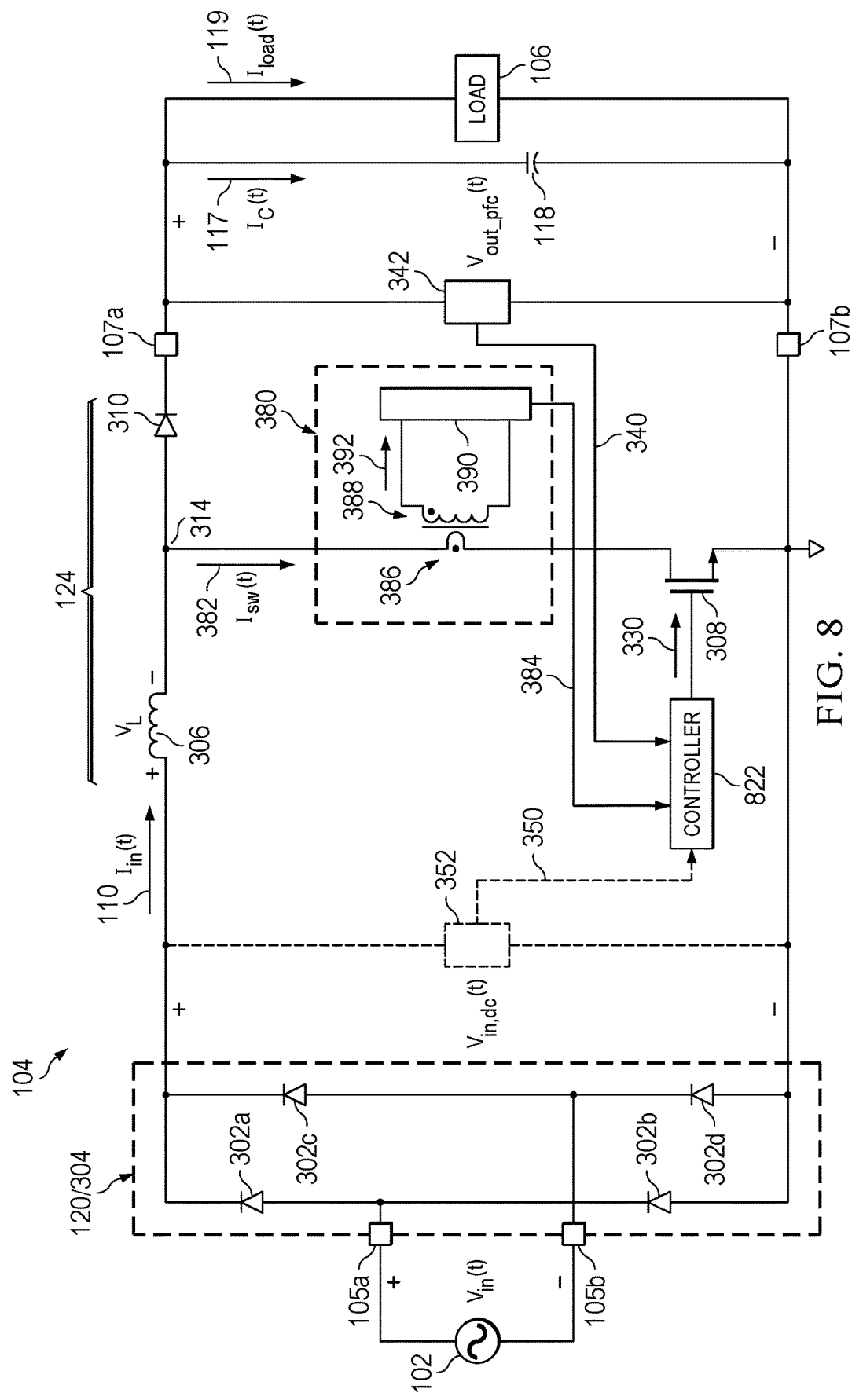
FIG. 8 is a schematic diagram of an example power supply system including a PFC circuit that can be part of the electric power transfer system of FIG. 1.

FIG. 8 is a schematic of an example power supply system 104 that can address at least some of issues described above. Referring to FIG. 8, power supply system 104 can include a controller 822. In a switching cycle, controller 822 can generate a ramp reference signal, which can ramp across a ramp signal range within the switching cycle, compare the ramp reference signal with measurement signal 384 (of switch current signal 382), and set the $t_{on}$ of control signal 330 for that switching cycle based on the comparison result. Measurement signal 384 can be in the form of an unsampled analog signal representing switch current signal 382 or induced current signal 392 during $t_{on}$, or can include multiple samples of switch current signal 382 or induced current signal 392 sampled within $t_{on}$. The ramp signal range can reflect a target/reference peak current for that switching cycle, which also reflects the DC input voltage signal 130 of that switching cycle. As part of a PFC operation, controller 822 may vary the ramp signal range to modulate the $t_{on}$ of control signal 330 across the switching cycles, and switch current can reach the target/reference peak current at the end of the $t_{on}$ of those switching cycles.

Controller 822 can be part of an integrated circuit, such as an application specific integrated circuit (ASIC), a field programmable gate array (FPGA), a microcontroller, or a general purpose central processing unit (CPU). In some examples, controller 822 can be integrated with one or more of inductor 306, switch 308, voltage measurement circuits 342 and 352, and current measurement circuit 380 in the same integrated circuit package. In some examples, controller 822 can be a separate integrated circuit chip from one or more of inductor 306, switch 308, voltage measurement circuits 342 and 352, and current measurement circuit 380.

Figure 9:
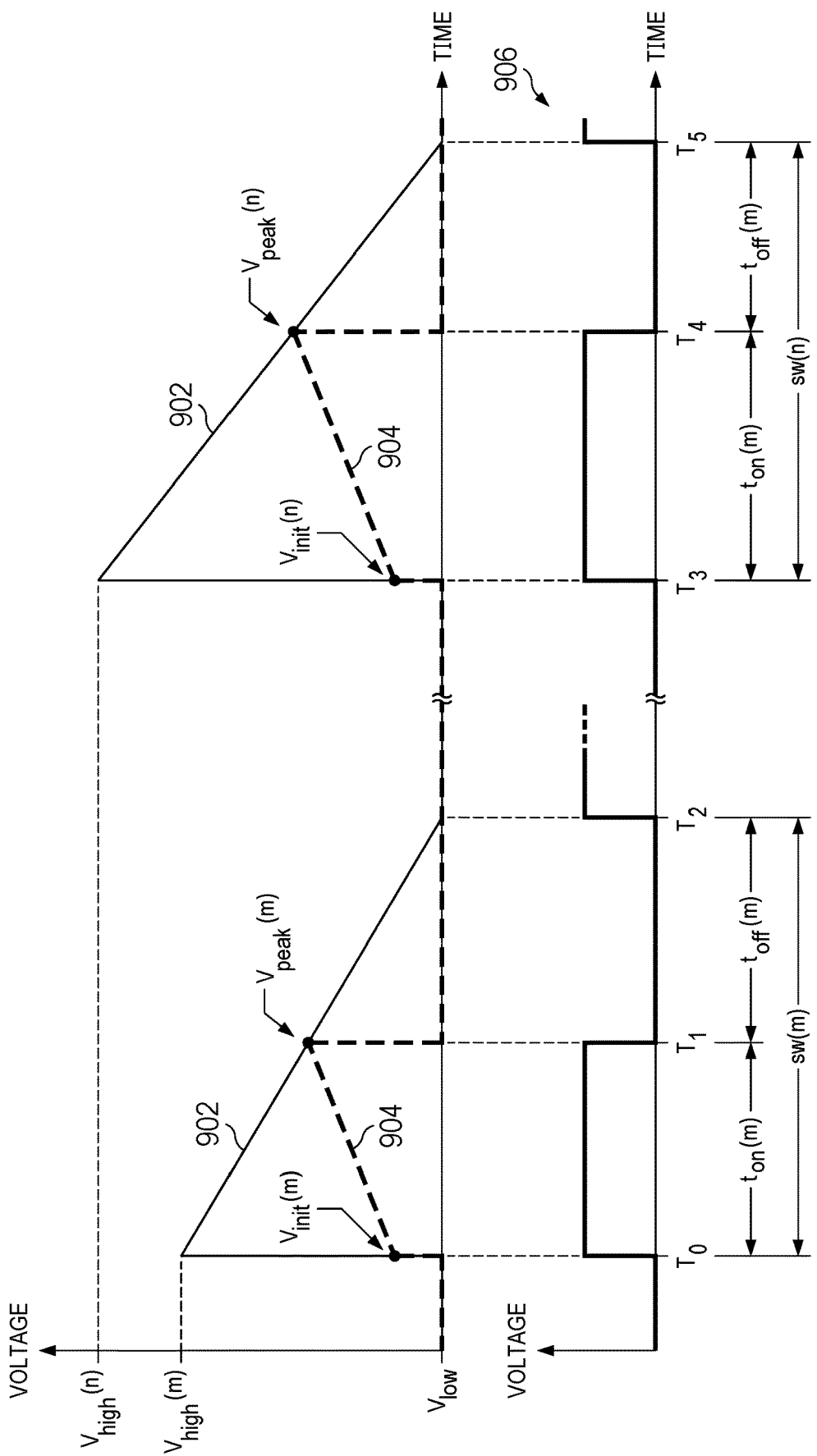
FIG. 9 includes waveform diagrams that illustrate example PFC operations supported by the PFC circuit of FIG. 8.

FIG. 9 includes waveform diagrams that illustrate an example PFC operation of PFC circuit 124 under the control of controller 822 of FIG. 8. FIG. 9 includes graphs 902, 904, and 906. Graph 902 illustrates the time variation of a ramp reference signal generated by controller 822, graph 904 illustrates the time variation of measurement signal 384 (of switch current 804), and graph 906 illustrates control signal 330.

At time $T_0$, an $m^{th}$ switching cycle sw(m) and an $m^{th}$ ramp cycle of the ramp reference signal begin. The ramp reference signal can have a ramp signal range between $V_{low}$ (which can be 0 volt) and $V_{high}$(m). The ramp reference signal can start at $V_{high}$(m) at $T_0$ and ramp down linearly with time to $V_{low}$ at the end of the $m^{th}$ ramp cycle at $T_2$. The $m^{th}$ switching cycle sw(m) also ends at $T_2$. Also, $t_{on}$(m) of the $m^{th}$ switching cycle can start at $T_0$. During $t_{on}$(m), inductor current increases as inductor 306 charges. Since switch 308 is enabled, switch current 804 can be equal to the inductor current, and measurement signal 384 increases with time. In a case of CCM operation, switch current 804 can start increasing from a non-zero initial current $I_{in\_init}(m)$, and measurement signal 384 can start increasing from a corresponding initial voltage $V_{init}(m)$. In a case of CCrM and DCM operations, the inductor current and measurement signal 384 can start increasing from zero.

After the start of the $m^{th}$ switching cycle at $T_0$, controller 822 can compare between the voltages of measurement signal 384 and the ramp reference signal to generate a decision, and set control signal 330 at an asserted state and extend the pulse if the decision indicates that measurement signal 384 has a lower voltage than ramp reference signal. If the decision indicates that measurement signal 384 intersects or exceeds the ramp reference signal, controller 822 can set control signal 330 at a deasserted state and end the pulse and $t_{on}(m)$. In the example of FIG. 9, measurement signal 384 intersects the ramp reference signal at $V_{peak}(m)$ at time $T_1$, and $V_{peak}(m)$ can correspond to a peak current $I_{in\_pk}(m)$. The peak current $I_{in\_pk}(m)$ can track the input DC voltage $V_{in,dc}$ at the $m^{th}$ switching cycle for improved PF.

The duration between $T_1$ and $T_2$ can be the $t_{off}(m)$ of the $m^{th}$ switching cycle, in which controller 822 maintains control signal 330 at the deasserted state. Since switch 308 is disabled, switch current 804 can also become zero. Inductor 306 can discharge and provide capacitor current signal 117 ($I_C(t)$) and load current signal 119 ($I_{load}(t)$).

At time $T_3$, an $n^{th}$ switching cycle sw(n) and an $n^{th}$ ramp cycle of the ramp reference signal begin. The ramp reference signal can have a ramp signal range between $V_{Low}$ and $V_{high}(n)$. $V_{high}(n)$ can be higher than $V_{high}(m)$ to reflect an increased target/reference peak current for the $n^{th}$ switching cycle. Also, $t_{on}(n)$ of the $n^{th}$ switching cycle can start at $T_3$, and controller 822 can set control signal 330 at the asserted state to enable switch 308. Measurement signal 384 (which represents the switch current and the inductor current) increases from $V_{init}(n)$ during $t_{on}(n)$ and intersects the ramp reference signal at $T_4$. Responsive to measurement signal 384 intersecting with (or exceeding) the ramp reference signal, controller 822 can set control signal 330 at a deasserted state and end the pulse and $t_{on}(n)$ at $T_4$.

Because of the increased $V_{high}(n)$, it can take a longer time for measurement signal 384 to intersect the ramp reference signal. Therefore, the duration of $t_{on}(n)$ of the $n^{th}$ switching cycle can become longer than the duration of $t_{on}(m)$ of the $m^{th}$ switching cycle. Also, the intersecting voltage of measurement signal 384 at $T_4$, $V_{peak}(n)$, can be higher than $V_{peak}(M)$, and the corresponding peak current $I_{in\_pk}(n)$ can be higher than peak current $I_{in\_pk}(M)$. Accordingly, by varying Vito and the ramp signal range, controller 822 can modulate $t_{on}$ and the inductor current (and AC input current signal 110) across switching cycles to support a PFC operation.

Figure 10:
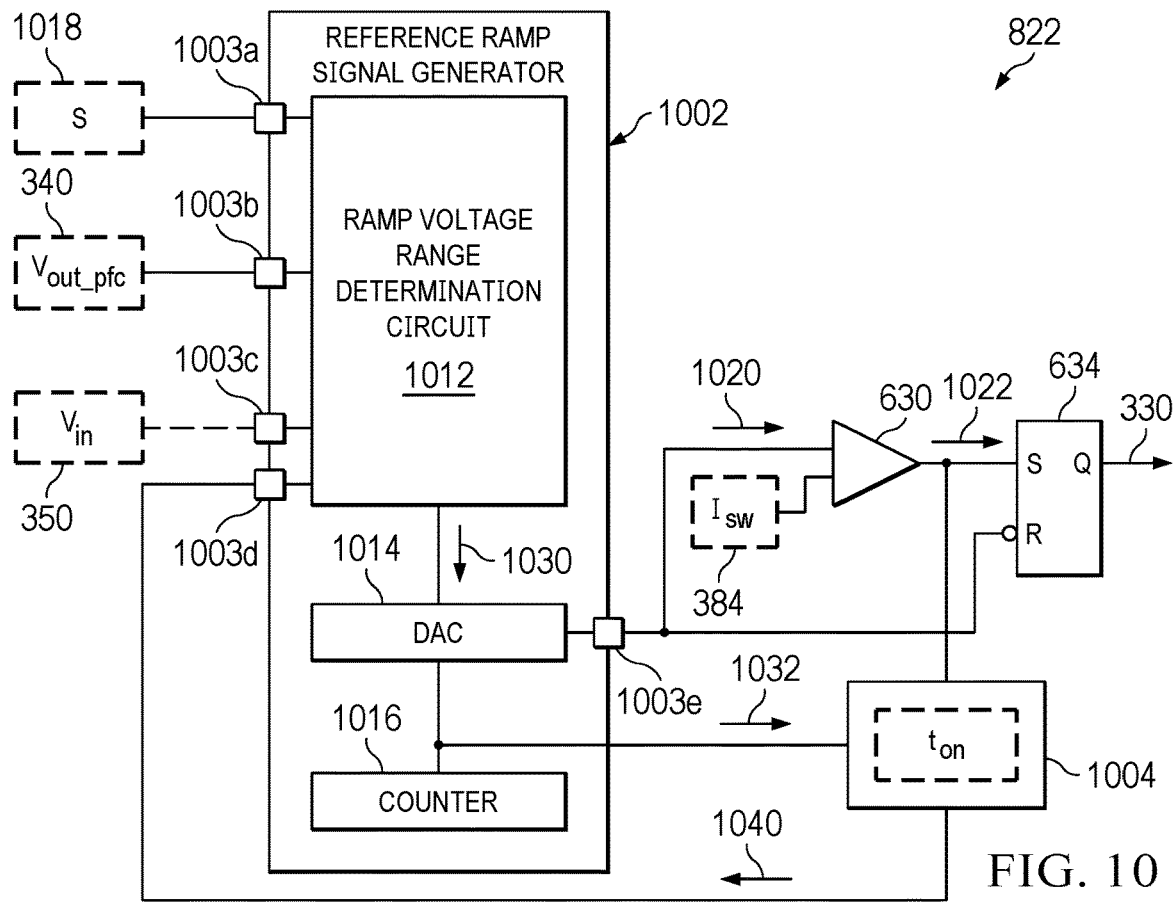
FIG. 10 and FIG. 11 are schematic diagrams of example internal components of a controller of the PFC circuit of FIG. 8.
Figure 11:
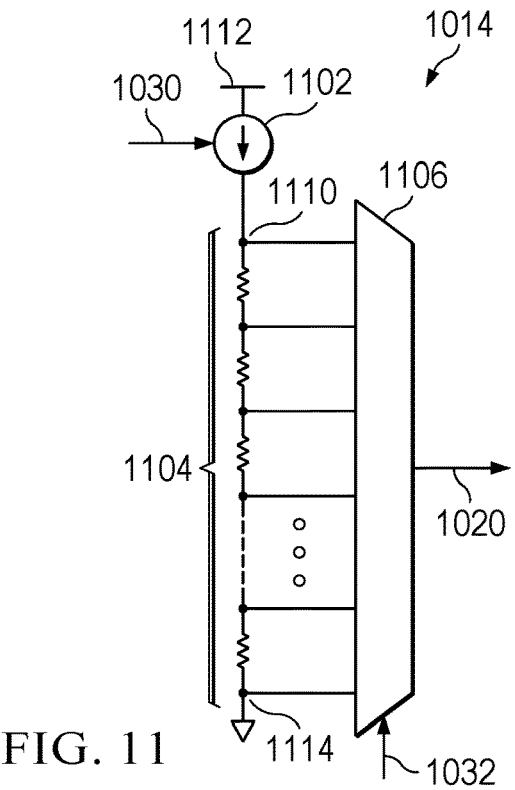

FIG. 10 and FIG. 11 illustrate examples of internal components of controller 822. Referring to FIG. 10, controller 822 can include a reference ramp signal generator circuit 1002, a memory 1004, comparator 630, and timing logic circuit 634 to generate control signal 330. Memory 1004 can include volatile and/or non-volatile memory, such as static random access memory (SRAM), dynamic random access memory (DRAM), flash memory, erasable programmable read-only memory (EPROM). Controller 822 may include a gate driver circuit (not shown in FIG. 10) to generate a drive signal for switch 308 responsive to control signal 330. In some examples, reference ramp signal generator circuit 1002 can have a control input 1003a, PFC inputs 1003b and 1003c, timing input 1003d, and ramp output 1003e. Reference ramp signal generator circuit 1002 can also include a ramp voltage range determination circuit 1012, a DAC 1014, and a counter 1016.

In a switching cycle, reference ramp signal generator circuit 1002 can provide a ramp reference signal 1020 at ramp output 1003e. Ramp reference signal 1020 can ramp across a ramp signal range determined by ramp voltage range determination circuit 1012 within the switching cycle, as shown in graph 902 of FIG. 9. Ramp voltage range determination circuit 1012 can have a scaling factor 1018 (labelled S in FIG. 10) via control input 1003a, and measurement signal 340 (of $V_{out\_pfc}$) via PFC input 1003b, and determine the ramp signal range based on $V_{out\_pfc}$ and S. Scaling factor 1018 can be based on voltage error signal 612 (the output of voltage feedback loop) or a parameter. Comparator 630 can compare ramp reference signal 1020 with measurement signal 384 (representing switch current 804 ($I_{sw}$)) to generate a decision signal 1022. Comparator 630 can receive ramp reference signal 1020 and measurement signal 384 as continuous analog voltage signals, sampled analog voltage signals, or digital values. Timing logic circuit 634 can include an SR latch that can be set by decision signal 1022 and reset by ramp reference signal 1020, with the reset being active low. At the beginning of the switching cycle, with ramp reference signal 1020 having a higher voltage than measurement signal 384, comparator 630 can provide an asserted decision signal 1022 to set the SR latch. In response to the SR latch being set, timing logic circuit 634 can generate an asserted control signal 330 to start the pulse. When measurement signal 384 exceeds ramp reference signal 1020, comparator 630 can trip and generate a deasserted decision signal 1022, which releases the set signal of the SR latch. Also, ramp reference signal 1020 can reset the SR latch. In response to the SR latch being reset, timing logic circuit 634 can generate a deasserted control signal 330 to stop the pulse and end the charging period duration $t_{on}$. Control signal 330 can remain deasserted for the remainder of the switching cycle, which corresponds to the discharging period duration $t_{off}$, until the start of the next switching cycle.

Prior to the switching cycle, ramp signal range determination circuit 1012 can determine the ramp voltage range 1030 (or the peak ramp voltage $V_{high}$ if $V_{low}$ is constant) for that switching cycle, and provide ramp voltage range 1030 to DAC 1014. DAC 1014 can also receive a count value 1032 from counter 1016, which can receive a clock signal and sweeps through a range of count values within a ramp cycle responsive to clock signal. DAC 1014 can generate ramp reference signal 1020 that ramps down from $V_{high}$ to $V_{low}$ in steps responsive to changes in count value 1032.

FIG. 11 illustrates an example of internal components of DAC 1014. Referring to FIG. 11, DAC 1014 can include a programmable current source 1102, a resistive ladder 1104, and a multiplexor circuit 1106. Programmable current source 1102 can be coupled between a first terminal 1110 of resistive ladder 1104 and a voltage source 1112, and a second terminal 1114 of resistor ladder 1104 can be coupled to a ground which provides $V_{low}$. Programmable current source 1102 can be programmed based on ramp voltage range information 1030 to supply a current to a resistive ladder 1104 that set the voltage of first terminal 1110 at $V_{high}$, and the current can reflect the ramp voltage range. Multiple tap points of resistive ladder 1104, each providing a different voltage between $V_{high}$ and $V_{low}$, are coupled to the inputs of multiplexor circuit 1106, and a selection input of multiplexor circuit 1106 can receive count value 1032. As counter 1016 sweeps through a range of count values within a switching cycle, multiplexor 1106 can output a different voltage from resistive ladder 1104 at different times within the switching cycle as ramp reference signal 1020.

Referring again to FIG. 10, ramp signal range determination circuit 1012 can also receive duration 1040 of $t_{on}$ via timing input 1003d, and determine the ramp voltage range 1030 (or $V_{high}$) for a subsequent switching cycle (e.g., $(m+1)^{th}$ switching cycle) based on S (which can be a parameter or based on voltage error signal 612), measurement signal 340 of PFC output voltage signal 132 ($V_{out\_pfc}$), and duration 1040 of $t_{on}$, all of which can be of a current or a prior switching cycle (e.g., $m^{th}$ cycle). Ramp voltage range determination circuit 1012 can receive duration 1040 from memory 1004, which can store count value 1032 from counter 1016 responsive to decision signal 1022 indicating end of $t_{on}$ of a switching cycle (when measurement signal 384 intersects reference ramp signal 1020). For CCM and CCrM operations, ramp voltage range determination circuit 1012 can determine $V_{high}(m+1)$ for an $(m+1)^{th}$ switching cycle as follows:

$$V_{high}(m+1) = S \times V_{out\_pfc}(m) + R \times \left(\frac{t_{on}(m) \times V_{out\_pfc}(m)}{2 \times L}\right) \quad \text{(Equation 7)}$$

In Equation 7, $V_{high}(m+1)$ represents the peak ramp signal voltage for an $(m+1)^{th}$ switching cycle. Also, S can be scaling factor 1018, which can be based on voltage error signal 612 or another parameter, $V_{out\_pfc}(m)$ represents the sampled PFC output voltage at the $m^{th}$ switching cycle, $t_{on}(m)$ represents the duration of $t_{on}$ of the $m^{th}$ switching cycle, L represents the inductance of inductor 306, and R represents is the resistance of a resistor of measurement circuit 390 to convert the sensed switch current 804 (or a scaled version of it) to a voltage. Using $V_{out\_pfc}$ and $t_{on}$ of a prior switching cycle to determine the $V_{high}$ for a current switching cycle can be based on $V_{out\_pfc}$ and the duration of $t_{on}$ being largely constant between consecutive switching cycles.

Also, Equation 7 can be extended to cover DCM operation as well. For DCM operation, ramp voltage range determination circuit 1012 can receive measurement signal 350 of $V_{in\_dc}$ via PFC input 1003c, and determine $V_{high}(m+1)$ for an $(m+1)^{th}$ switching cycle as follows:

$$V_{high}(m+1) = \left(\frac{S \times V_{in\_dc}(m) \times T \times (V_{out\_pfc}(m) - V_{in\_dc}(m))}{t_{on}(m) \times V_{out\_pfc}(m)} + R \times \left(\frac{t_{on}(m) \times V_{in\_dc}(m)}{2 \times L}\right)\right) \times \frac{T}{T - t_{on}(m)} \quad \text{(Equation 8)}$$

In Equation 8, $t_{on}(m)$ represents the duration of $t_{on}$ of the $m^{th}$ switching cycle, and T represents the cycle period of each switching cycle/ramp cycle. In some examples, ramp voltage range determination circuit 1012 can determine $t_{on}$ based on the range of count value 1032.

The following derivations can show that comparing measurement signal 384 (representing $I_{sw}$) with a ramp reference signal having $V_{high}$ set according to Equation 7 allows the average current $I_{avg}$ to be proportional to and follow the shape of DC input voltage signal 130 ($V_{in\_dc}$).

During $t_{on}$ of a switching cycle, with switch 308 enabled and a voltage across inductor 306 equal to $V_{in\_dc}$, the inductor current (and switch current 804, $I_{sw}$) can increase from $I_{in\_init}$ (e.g., at $T_0/T_3$ in FIG. 9) to $I_{in\_pk}$ (e.g., at $T_1/T_4$ in FIG. 9). Equation 4 above can be rewritten as follows:

$$I_{in\_pk} - I_{in\_init} = \frac{V_{in,dc} \times t_{on}}{L} \quad \text{(Equation 9)}$$

Also, the average current $I_{avg}$, for CCM and CCrM modes of operation, can be related to $I_{in\_init}$ and $I_{in\_pk}$ as follows:

$$I_{avg} = \frac{I_{in\_pk} + I_{in\_init}}{2} \quad \text{(Equation 10)}$$

Combining Equations 9 and 10:

$$I_{avg} = I_{in\_pk} - \frac{V_{in,dc} \times t_{on}}{2 \times L} \quad \text{(Equation 11)}$$

Also, with reference ramp signal 1020 decreasing linearly with time from $V_{high}$ to $V_{low}$, with $V_{low}$ being equal to zero, the intersecting voltage $V_{peak}$ between measurement signal 384 and ramp reference signal 1020 can be related to $V_{peak}$, the durations of $t_{off}$ and the switching/ramp cycle period T as follows:

$$\frac{I_{in\_pk} \times R}{V_{high}} = \frac{t_{off}}{T} \quad \text{(Equation 12)}$$

In Equation 12, $V_{peak}$ is replaced by $I_{in\_pk} \times R$, where R is the same as in Equation 7 and represents the resistance of a resistor of measurement circuit 390 to convert the sensed current into a voltage.

For CCM and CCrM in steady state, DC input voltage signal 130 and PFC output voltage signal 130 can be related to the durations of $t_{off}$ and the switching/ramp cycle period T as follows:

$$\frac{V_{in\_dc}}{V_{out\_pfc}} = \frac{t_{off}}{T} \quad \text{(Equation 13)}$$

Combining Equations 12 and 13:

$$I_{in\_pk} = \frac{V_{high}}{R} \times \frac{V_{in\_dc}}{V_{out\_pfc}} \quad \text{(Equation 14)}$$

Combining Equations 7, 9, 11, and 14, with the $V_{high}$ term substituted according to Equation 7:

$$I_{avg} = \frac{\left(S \times V_{out\_pfc} + R \times \frac{V_{out\_pfc} \times t_{on}}{2 \times L}\right)}{R} \times \frac{V_{in\_dc}}{V_{out\_pfc}} - \frac{V_{in,dc} \times t_{on}}{2 \times L} \quad \text{(Equation 15)}$$

Equation 15 can be rewritten into:

$$I_{avg} = \frac{S \times V_{out\_pfc}}{R} \times \frac{V_{in\_dc}}{V_{out\_pfc}} + \quad \text{(Equation 16)}$$

-continued $$\frac{V_{out\_pfc} \times t_{on}}{2 \times L} \times \frac{V_{in\_dc}}{V_{out\_pfc}} - \frac{V_{in,dc} \times t_{on}}{2 \times L}$$

And Equation 16 can be simplified to become:

$$I_{avg} = \frac{S \times V_{in\_dc}}{R} \qquad \text{(Equation 17)}$$

Referring to Equation 17, S can be constant across the switching cycles, such as when the voltage control loop reaches a steady state and voltage error signal 612 can be largely constant. Accordingly, the average current $I_{avg}$ can be proportional to and follow the shape of $V_{in\_dc}$, which can improve PF and reduce harmonic distortions in the AC input current.

The following derivations can show that comparing measurement signal 384 (representing $I_{sw}$) with a ramp reference signal having $V_{high}$ set according to Equation 8 allows the average current $I_{avg}$ to be proportional to and follow the shape of DC input voltage signal 130 ($V_{in\_dc}$).

In DCM mode, the average current in a switching cycle can be given by the following Equation, which can be based on Equation and account for zero current during the $t_{zero}$ duration of FIG. 5:

$$I_{avg} = \left(I_{in\_pk} - \frac{V_{in,dc} \times t_{on}}{2 \times L}\right) \times \frac{t_{on} + t_{off}}{T} \qquad \text{(Equation 18)}$$

In steady state, inductor volt-second is balanced in a switching cycle, therefore:

$$V_{in,dc} \times t_{on} = (V_{out\_pfc} - V_{in,dc}) \times t_{off} \qquad \text{(Equation 19)}$$

Equations 18 and 19 can be combined:

$$I_{avg} = \left(I_{in\_pk} - \frac{V_{in,dc} \times t_{on}}{2 \times L}\right) \times \frac{t_{on} \times V_{out\_pfc}}{T \times (V_{out\_pfc} - V_{in,dc})} \qquad \text{(Equation 20)}$$

For DCM, Equation 12 becomes:

$$\frac{I_{in\_pk} \times R}{V_{high}} = \frac{T - t_{on}}{T} \qquad \text{(Equation 12)}$$

Combining Equation 8 and Equation 12 for DCM:

$$I_{in\_pk} = \frac{S \times V_{in\_dc} \times T \times (V_{out\_pfc} - V_{in\_dc})}{R \times t_{on} \times V_{out\_pfc}} + \frac{t_{on} \times V_{in\_dc}}{2 \times L} \qquad \text{(Equation 21)}$$

Combining Equations 20 and 21:

$$I_{avg} = \left(\frac{S \times V_{in\_dc} \times T \times (V_{out\_pfc} - V_{in\_dc})}{R \times t_{on} \times V_{out\_pfc}} + \frac{V_{in,dc} \times t_{on}}{2 \times L} - \frac{V_{in,dc} \times t_{on}}{2 \times L}\right) \times \frac{t_{on} \times V_{out\_pfc}}{T \times (V_{out\_pfc} - V_{in,dc})} \qquad \text{(Equation 22)}$$

And Equation 22 can be simplified into Equation 17.

In contrast with the PFC operation of FIG. 7, in which controller 312 samples the return path current (or inductor current) at the midpoint of $t_{on}$ of a switching cycle to determine the average current and generate current error signal 620 for the switching cycle, in the PFC operation in FIG. 9 controller 822 needs not sample switch current 804 at any specific time point. Controller 822 can receive measurement signal 384 as a continuous analog voltage signal, compare measurement signal 384 against reference ramp signal 1020 to generate decision signal 1022, and end $t_{on}$ responsive to decision signal 1022 indicating that the switch current reaches a target peak current for that switching cycle. With such arrangements, the PFC operation of FIG. 9 can be less prone to clock jitters, which could otherwise introduce variable sampling time offsets and increase the harmonic distortions in the AC input current in the PFC operation of FIG. 7.

Also, for CCM and CrCM operations, comparator 630 and timing logic circuit 634 can modulate $t_{on}$ based on measurement signal 384 of switch current $I_{sw}$. Measurement signal 340 can be generated from measurement circuits on the secondary side of the isolation boundary between primary coil 386 and secondary coil 388. Accordingly, for CCM and CrCM operations, controller 822 needs not cross the isolation boundary to receive measurement signal 350 of $V_{in\_dc}$, which can be generated from measurement circuits on the primary side. Such arrangements can facilitate integration of controller 822 with other circuits that can be on the secondary side, such as power converter circuit 122 of FIG. 1.

Figure 12:
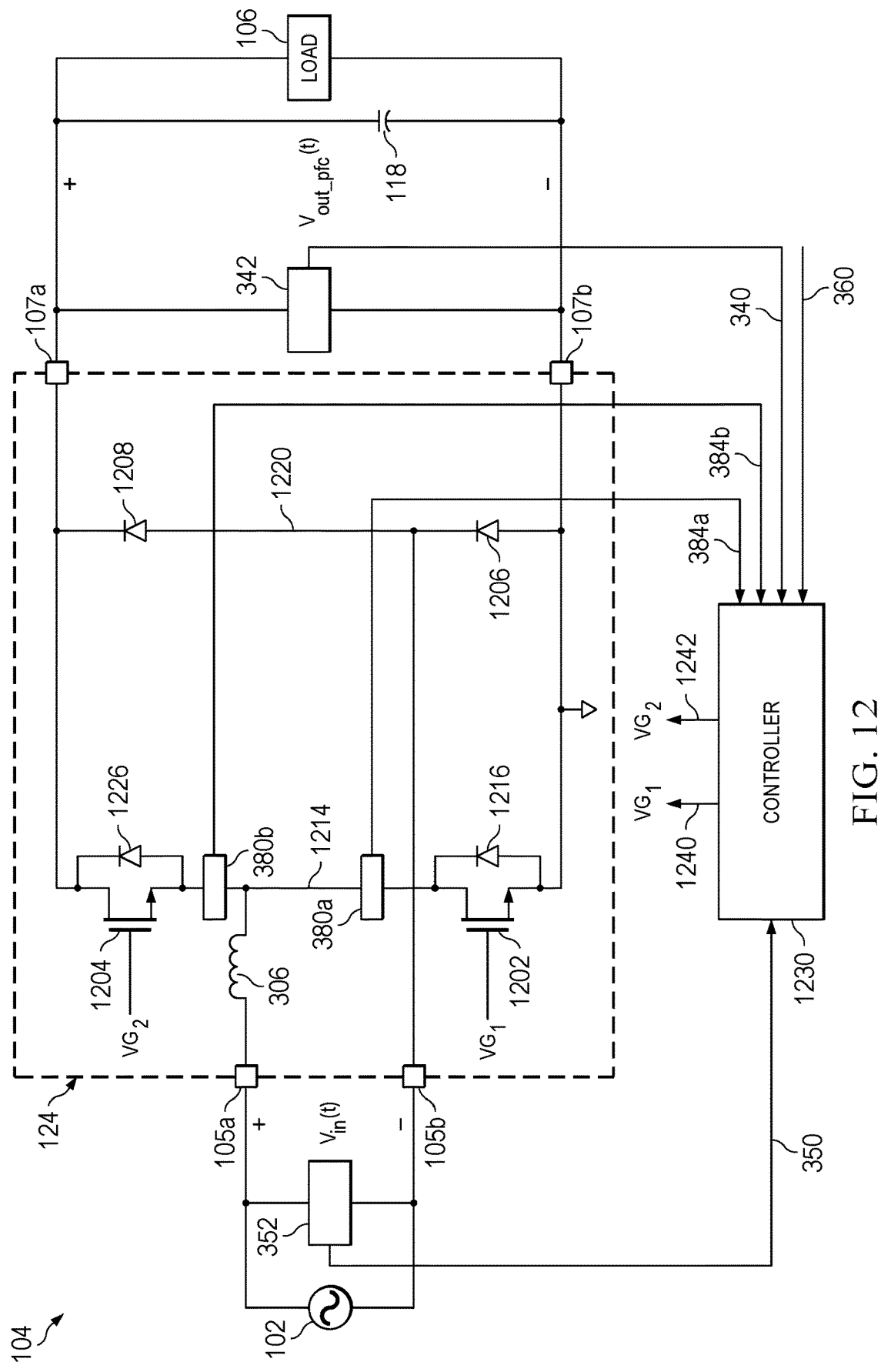
FIG. 12 is a schematic diagram of an example power supply system including a PFC circuit that can be part of the electric power transfer system of FIG. 1.

FIG. 12 illustrates another example PFC circuit 124 that can perform a PFC operation based on the techniques described in FIGS. 8-11. Referring to FIG. 12, PFC circuit 124 of power supply system 104 can include inductor 306, switches 1202 and 1204, and diodes 1206 and 1208. Switches 1202, 1204, and inductor 306 are coupled at a node 1214, and switches 1202 and 1204 are coupled in series between positive output 107a and negative output 107b. Node 1214 can switch between the positive and negative power supply rails and can be a switching node. Also, diodes 1206 and 1208 are coupled at a node 1220, and diodes 1206 and 1208 are also coupled in series between positive output 107a and negative output 107b. Inductor 306 is coupled between positive input 105a and node 1214, and node 1220 between diodes 1206 and 1208 is coupled to negative input 105b. In some examples, each of switches 1202 and 1204 can include a transistor such as an NFET or a GaN HEMT. In some examples, each of diodes 1206 and 1208 can be a body diode of a respective NFET. Switch 1202 can have a body diode 1216, and switch 1204 can have a body diode 1226.

Power supply system 104 also includes a controller 1230 coupled to the switches, voltage measurement circuits 342 and 352, and current measurement circuits 380a and 380b. Primary coil 386 of current measurement circuit 380a can be coupled between switch 1202 and node 1214, and primary coil 386 of current measurement circuits 380b can be coupled between switch 1204 and node 1214. In some examples, switches 1202 and 1204, diodes 1206 and 1208, and inductor 306 can be configured as a totem pole rectifier. Controller 1230 can generate control signals 1240 (labelled VG$_1$) and 1242 (labelled VG$_2$) to enable/disable, respectively, switches 1202 and 1204 to perform rectification and PFC operations. Controller 1230 can generate the control signals based on measurement signals 340, 350, 384a, and 384b from, respectively, voltage measurement circuits 342 and 352, and current measurement circuits 380a and 380b. Controller 1230 can be part of an integrated circuit, such as an ASIC, an FPGA, or a general purpose CPU, and can be integrated with or separate from one or more of inductor 306, diodes 1206 and 1208, switches 1202 and 1204, voltage measurement circuits 342 and 352, and current measurement circuits 380a and 380b.

Figure 13:
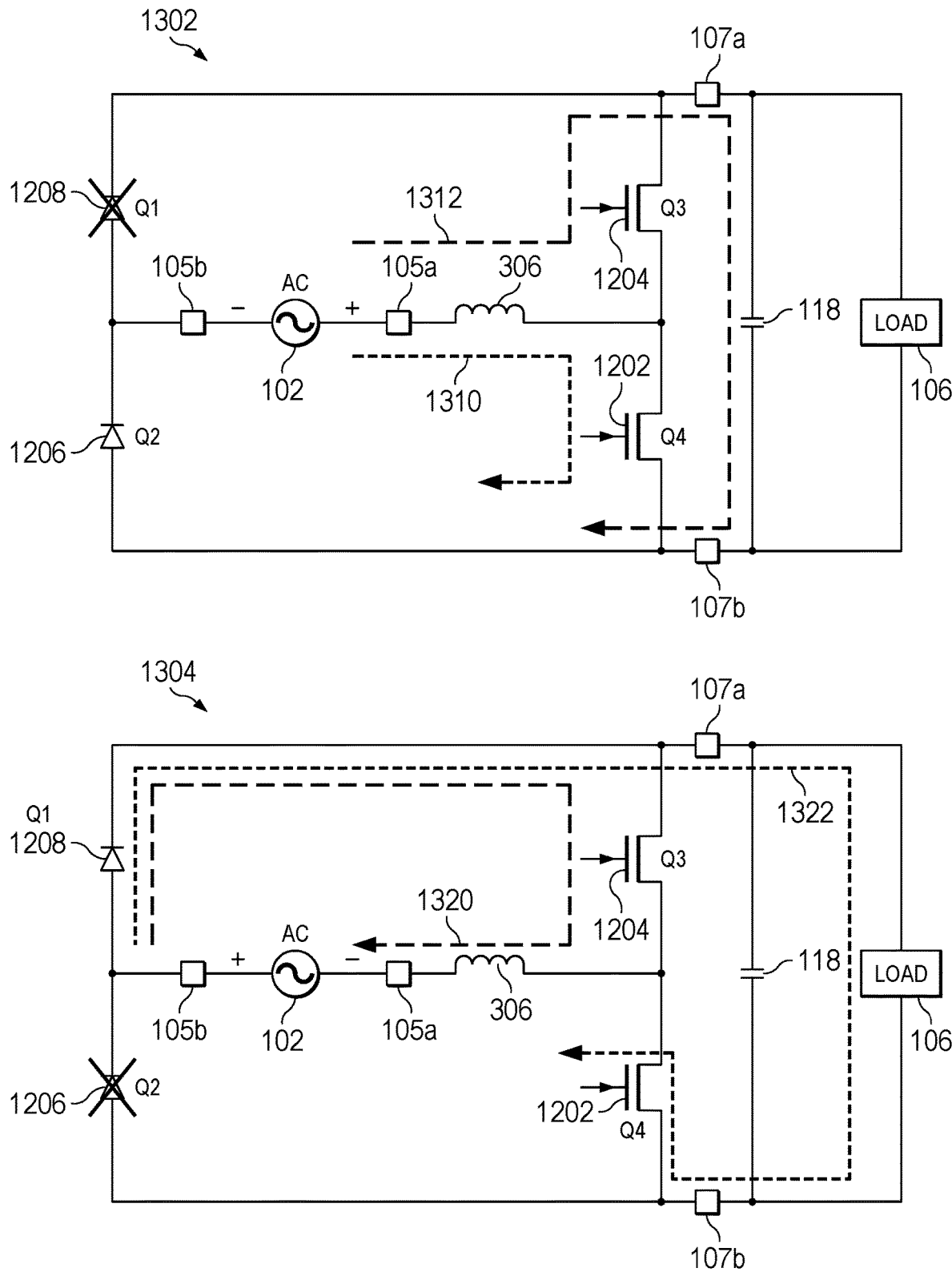
FIG. 13 includes waveform diagrams that illustrate example operations of the PFC circuit of FIG. 12.

FIG. 13 illustrates example operations of PFC circuit 124 of FIG. 12. Diagram 1302 illustrates an operation of PFC circuit 124 during a positive half-cycle of AC input voltage signal 108, and diagram 1304 illustrates an operation of PFC circuit 124 during the negative half-cycle. In diagrams 1302 and -1304, diodes 1206 and 1208 are labelled Q2 and Q1 respectively, and switches 1202 and 1204 are labelled Q4 and Q3 respectively.

Referring to diagram 1302, during a positive half-cycle of $V_{in}$, when negative input 105b receives a lower voltage than positive input 105a, Q2 (diode 1206) is forward biased and Q1 (diode 1208) is reverse biased. The forward biased Q2 can connect negative output 107b to negative input 105b, and the reverse biased Q1 can disconnect positive output 107a from negative input 105b. During a charging interval, controller 1240 can disable Q3 and enable Q4 to enable inductor 306 to charge, and an inductor current 1310 can flow from positive input 105a through inductor 306 and Q4 and return back to negative input 105b. The inductor current (which equals the switch current through Q4) can increase with time similar to switch current 804 illustrated in graph 904 of FIG. 9. Also, during a discharging interval, controller 1240 can enable Q3 (switch 1204) and disable Q4 (switch 1202). The switch current through Q4 can be zero. An inductor current 1312 can flow from the positive input 105a, through inductor 306 and switch 1204 to capacitor 118 and load 106, and positive output 107a (and the positive power supply rail) can be connected to positive input 105a. Accordingly, positive output 107a can have a positive polarity and negative output 107b can have a negative polarity during the positive half-cycle.

Referring to diagram 1304, during a negative half-cycle of $V_{in}$ when negative input 105b receives a higher voltage than positive input 105a, Q2 is reverse biased and Q1 is forward biased. The forward biased Q1 can connect negative input 105b to positive output 107a, and the reverse biased Q2 can disconnect negative input 105b from negative output 107b. During a charging interval, controller 1240 can enable Q3 and disable Q4 to enable inductor 306 to charge, and an inductor current 1320 (which equals the switch current through Q3) can flow from negative input 105b, through Q3 and inductor 306, and return back to positive input 105a. The inductor current can increase with time similar to switch current 804 illustrated in graph 904 of FIG. 9. Also, during a discharging interval, controller 1240 can enable Q4 and disable Q3. An inductor current 1322 can flow from negative input 105b, through capacitor 118 and load 106, and return back via Q4 and inductor 306, and positive output 107a (and the positive power supply rail) can be connected to negative input 105b. Accordingly, positive output 107a can also have a positive polarity and negative output 107b can also have a negative polarity during the negative half-cycle.

Figure 14:
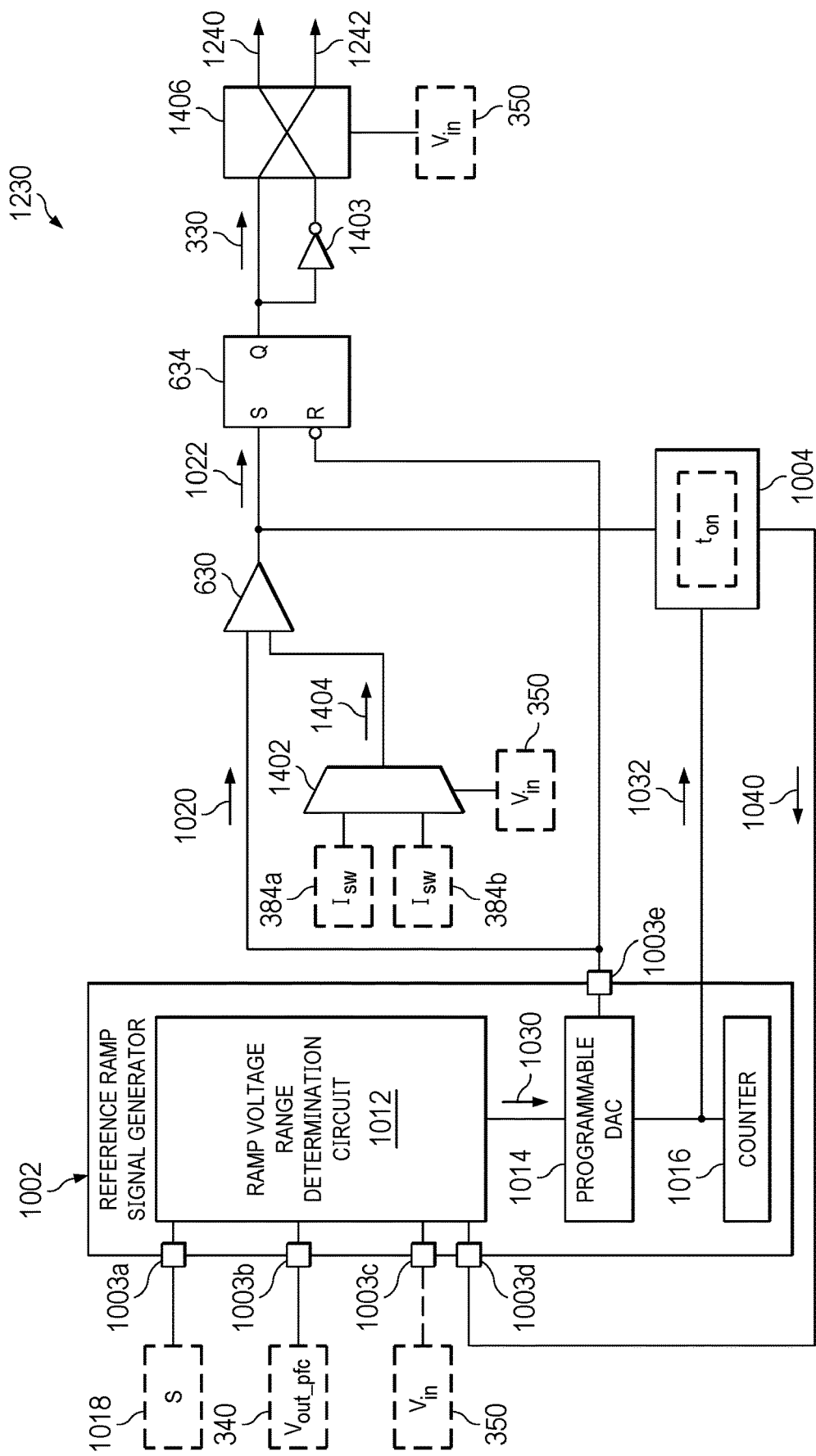
FIG. 14 is a schematic diagram of example internal components of a controller of the PFC circuit of FIG. 12.

FIG. 14 illustrates examples of internal components of controller 1230. Referring to FIG. 14, controller 1230 can include components of controller 822, such as reference ramp signal generator 1002, memory 1004, comparator 630, and timing logic circuit 634. In addition, controller 1230 can also include a multiplexor 1402, an inverter 1403, and a control signal router 1406. Multiplexor 1402 can receive measurement signals 384a and 384b from the respective current measurement circuits 380a and 380b, and selectively forward one of them as measurement signal 1404 based on measurement signal 350 of $V_{in}$. Specifically, if measurement signal 350 indicates a positive half-cycle, multiplexor 1402 can forward measurement signal 384a (representing switch current of switch 1202) as measurement signal 1404. Also, if measurement signal 350 indicates a negative half-cycle, multiplexor 1402 can forward measurement signal 384b (representing switch current of switch 1204) as measurement signal 1404.

Also, controller 1230 can provide complimentary control signals 1240 and 1242, such that when switch 1202 is enabled, switch 1204 is disabled, and vice versa. Controller 1230 can include inverter 1403 coupled with the output of timing logic circuit 634 to generate inverted control signal 330. Control signal router 1406 can route control signal 330 and inverted control signal 330 based on measurement signal 350 of $V_{in}$. Specifically, if measurement signal 350 indicates a positive half-cycle, control signal router 1406 can route control signal 330 to switch 1202 as control signal 1240, and route inverted control signal 330 to switch 1204 as control signal 1242. Also, if measurement signal 350 indicates a negative half-cycle, control signal router 1406 can route control signal 330 to switch 1204 as control signal 1242, and route inverted control signal 330 to switch 1202 as control signal 1240.

Figure 15:
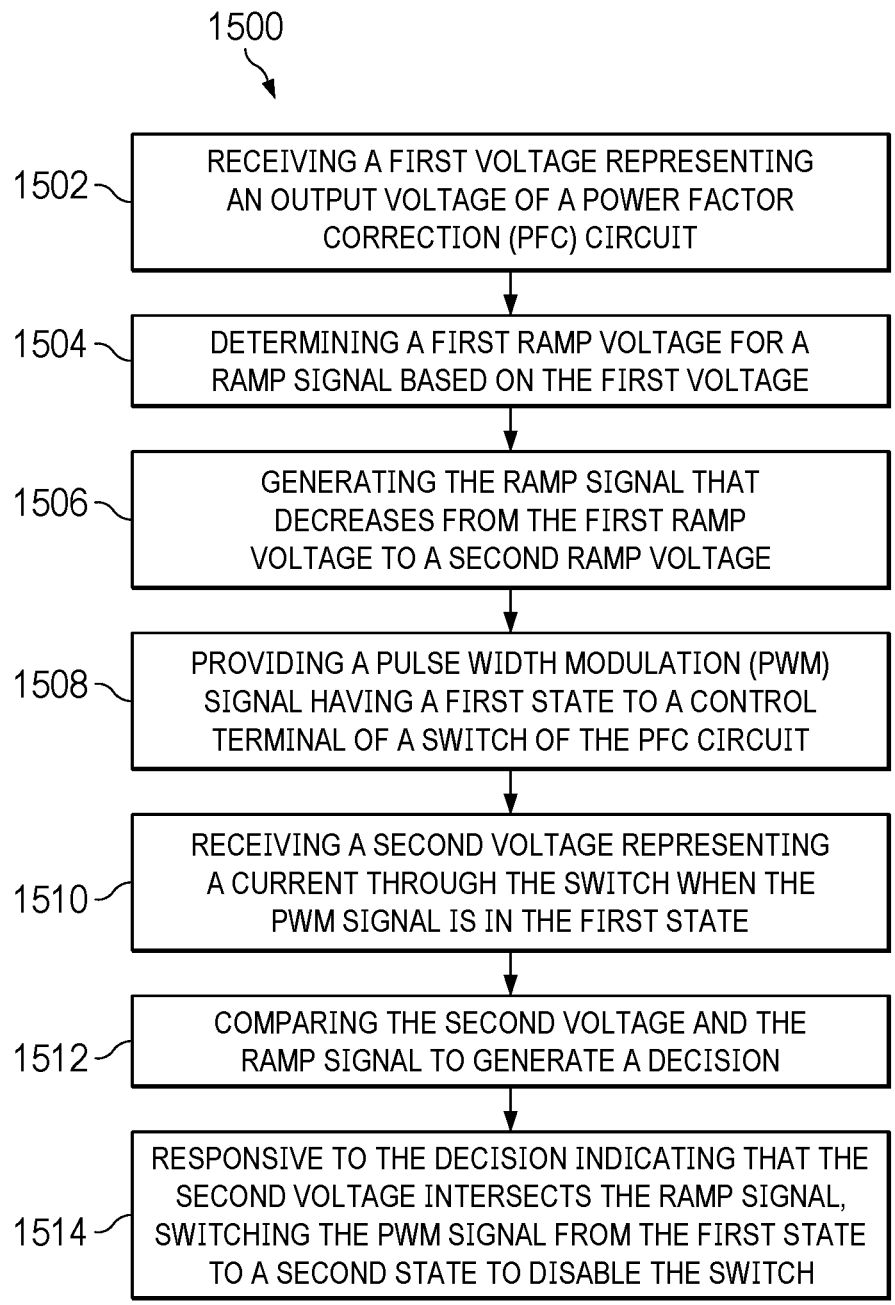
FIG. 15 is a flowchart of an example method of controlling a PFC circuit, in various examples.

FIG. 15 includes a flowchart of an example method 1500 of controlling a PFC circuit, such as PFC circuit 124 of FIGS. 8 and 12. PFC circuit 124 can have a PFC input terminal and a PFC output terminal. Referring to FIG. 8, PFC circuit 124 can be coupled to a rectifier circuit 120 and can include inductor 306, switch 308, and diode 310, with inductor 306 coupled between the PFC input terminal and a current terminal of switch 308, and diode 310 coupled between the current terminal and the PFC output terminal. Referring to FIG. 12, PFC circuit 124 can include inductor 306, switches 1202 and 1204, and diodes 1206 and 1208 configured as a totem pole rectifier. Method 1500 can be performed by a controller, such as controller 822 of FIG. 8 and controller 1230 of FIG. 12.

In step 1502, the controller receives a first voltage from the output of the PFC circuit. The first voltage can represent PFC output voltage signal 132 ($V_{out\_pfc}(t)$). The controller can receive measurement signal 340 representing $V_{out\_pfc}(t)$. The first voltage can be sampled during a first switching cycle, which also coincides with a first ramp cycle.

In step 1504, the controller can determine a first ramp voltage for a ramp signal based on the first voltage.

Specifically, the controller can receive the $t_{on}$ duration of the first switching cycle, and determine the first ramp voltage ($V_{high}$) for a second ramp cycle after the first ramp cycle. The controller can store the $t_{on}$ duration information in a memory (e.g., memory 1004) and read the information from the memory. The controller can also receive a scaling factor S, which can be a parameter or can be based on voltage error signal 612 from a voltage control loop.

For CCM and CCrM operations, the controller can determine the first ramp voltage based on the PFC output voltage and the $t_{on}$ duration of the first switching cycle according to Equation 7. For DCM operation, the controller can also receive measurement signal 350 representing the input voltage to PFC circuit 124 in the first switching cycle ($V_{in\_dc}$ or $V_{in}$), the $t_{off}$ duration of the first switching cycle, and the duration of a switching cycle (T), and determine the first ramp voltage based on the input voltage, the PFC output voltage, the $t_{on}$, $t_{off}$, and T durations according to Equation 8.

In step 1506, the controller can generate the ramp signal that decreases from the first ramp voltage to a second ramp voltage. The controller can include DAC 1014 and counter 1016. Counter 1016 can provide a set of count values to DAC 1014, which can provide an analog voltage as the ramp signal and decrease the analog voltage from the first ramp voltage to a second ramp voltage (e.g., zero) responsive to the count values during the second ramp cycle.

In step 1508, the controller can provide a pulse width modulation (PWM) signal having a first state to a control terminal of a switch of the PFC circuit.

Specifically, the controller can provide the PWM signal in a second switching cycle that coincides with the second ramp cycle. From the beginning of the second switching cycle, the charging interval $t_{on}$ starts, and the PWM signal can be in the first state (e.g., an asserted state). The switch to receive the PWM signal can be switch 308 of FIG. 8, switch 1202 of FIG. 12 during a positive half-cycle, or switch 1204 of FIG. 12 during a negative half-cycle. The switch can be enabled to provide a return path of the inductor current back to AC power source 102 to allow inductor 306 to charge.

In step 1510, the controller can receive a second voltage representing through the switch when the PWM signal is in the first state. Referring again to FIG. 9, the second voltage can represent a switch current that equals the inductor current and increases with time within the charging interval of the second switching cycle. The second voltage can be measurement signal 384 from current measurement circuit 380 of FIG. 8, or one of measurement signals 380a/380b from respective current measurement circuits 380a/380b of FIG. 12.

In step 1512, the controller can compare the second voltage and the ramp signal to generate a decision, and in step 1514, responsive to the decision indicating that the second voltage intersects the ramp signal, the controller can switch the PWM signal from the first state to a second state to disable the switch.

Specifically, referring again to FIG. 9, the controller can maintain the PWM signal in the first state and extend $t_{on}$ of the second switching cycle if decision signal 1022 indicates that the second voltage remains below the ramp signal. If decision signal 1022 indicates that the second voltage intersects or exceeds the ramp signal, the controller can end $t_{on}$ and start $t_{off}$ by switching the PWM signal from the first state to the second state (e.g., a deasserted state). The switch (switch 308 of FIG. 8, switch 1202 of FIG. 12 during a positive half-cycle, or switch 1204 of FIG. 12 during a negative half-cycle) can be disabled till the end of the second switching cycle.

Any of the methods described herein may be totally or partially performed with a computing system including one or more processors, which can be configured to perform the steps. Thus, embodiments can be directed to computing systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described herein as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

Certain components may be described herein as being of a particular process technology, but these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor.

Uses of the phrase "ground voltage potential" in this description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described examples, and other examples are possible, within the scope of the claims.

What is claimed is:

1. An apparatus comprising: a ramp generation circuit having an input and an output; a comparator having a comparator output and first and second comparator inputs, the first comparator input coupled to the output of the ramp generation circuit, the second comparator input configured to be coupled to a current measurement circuit output; a pulse width modulation (PWM) generation circuit having a PWM control input and a switch control output, the PWM control input coupled to the comparator output; and a memory having a memory input and a memory output, the memory input coupled to the comparator output, wherein: the memory is configured to store a value representing a duration of a PWM signal; and the ramp generation circuit is configured to provide a first ramp voltage of a second ramp cycle based on the value stored in the memory.

2. The apparatus of claim 1, wherein:
the input of the ramp generation circuit is coupled to a power factor correction (PFC) output terminal;
the ramp generation circuit is configured to:
determine the first ramp voltage based on a first voltage at the input of the ramp generation circuit; and
provide a ramp signal that decreases from the first ramp voltage to a second ramp voltage;
the comparator is configured to provide a decision signal at the comparator output by comparing the ramp signal and the current measurement circuit output coupled to the second comparator input; and
the PWM generation circuit is configured to change a state of the PWM signal at the switch control output responsive to the decision signal indicating that a signal at the current measurement circuit output intersects the ramp signal.

3. The apparatus of claim 2, wherein the signal at the current measurement circuit output reflects a current through a PFC switch when the PWM signal is in a first state.

4. The apparatus of claim 3, wherein the apparatus further comprises a current transformer magnetically coupled to a current terminal of the PFC switch and configured to generate the signal at the current measurement circuit output by sensing the current.

5. The apparatus of claim 3, wherein the ramp signal decreases from the first ramp voltage to the second ramp voltage within a ramp cycle period;
wherein the PWM signal has a switching cycle period, in which the PWM signal switches from the first state to a second state; and
wherein the switching cycle period equals the ramp cycle period.

6. The apparatus of claim 5,
wherein the ramp generation circuit has a timing input, the timing input coupled to the memory output, and the ramp generation circuit is configured to:
read the value from the memory via the timing input; and
determine the first ramp voltage for the ramp signal of the second ramp cycle after a first ramp cycle that coincides with the first switching cycle; and
provide the ramp signal in the second ramp cycle.

7. The apparatus of claim 2, wherein the ramp generation circuit includes:
a ramp voltage range determination circuit having a processing input and a ramp voltage range output, the processing input coupled to the input of the ramp generation circuit, and the ramp voltage range determination circuit configured to provide a ramp voltage range signal at the ramp voltage range output based on the first voltage;
a digital-to-analog converter (DAC) having a ramp voltage range input, a digital input, and an analog output, the ramp voltage range input coupled to the ramp voltage range output, the DAC configured to:
determine the first ramp voltage based on the ramp voltage range signal; and
provide the ramp signal at the analog output, and reduce the ramp signal from the first ramp voltage to the second ramp voltage in steps responsive to changes in a state of the digital input; and
a counter having a clock input and a counter output, the counter output coupled to the digital input.

8. The apparatus of claim 2, wherein the ramp generation circuit has a control input and configured to determine the first ramp voltage based on a signal at the control input.

9. The apparatus of claim 8, further comprising an amplifier having an amplifier output and first and second amplifier inputs, the first amplifier input coupled to the PFC output terminal, and the second amplifier input coupled to a reference terminal.

10. The apparatus of claim 9, wherein the amplifier is part of a voltage feedback loop to regulate the first voltage based on a reference voltage at the reference terminal.

11. The apparatus of claim 2, wherein the input of the ramp generation circuit is a first PFC input, and the ramp generation circuit has a second PFC input coupled to a PFC input terminal; and
wherein the ramp generation circuit is configured to determine the first ramp voltage based on a duration of a switching cycle period of the PWM signal and a third voltage at the PFC input terminal.

12. The apparatus of claim 2, wherein:
the switch control output is a first PFC switch control output;
the PWM generation circuit has a second PFC switch control output and configured to provide a second PWM signal at the second PFC switch control output;
wherein the apparatus further comprises:
a first current transformer magnetically coupled to a first current terminal of a first PFC switch, the first current transformer having a first current measurement output;
a second current transformer magnetically coupled to a second current terminal of a second PFC switch, the second current transformer having a second current measurement output;
a multiplexor having a multiplexor output, first and second multiplexor inputs, and a first selection input, the first multiplexor input coupled to the first current measurement output, the second multiplexor input coupled to the second current measurement output, the first selection input coupled to a PFC input terminal, and the multiplexor output coupled to the second comparator input; and
a control signal routing circuit having a first control signal input, a second control signal input, a first control signal output, a second control signal output, and a second selection input, the first control signal input coupled to the first PFC switch control output, the second control signal input coupled to the second PFC switch control output, the second selection input coupled to the PFC input terminal, the first control signal output coupled to a first control terminal of the first PFC switch, and the second control signal output coupled to a second control terminal of the second PFC switch, the control signal routing circuit configured to:
responsive to the second selection input having a first state, connect the first control signal input to the first control signal output and the second control signal input to the second control signal output; and
responsive to the second selection input having a second state, connect the second control signal input to the first control signal output and the first control signal input to the second control signal output.

13. A method comprising: receiving a first voltage from an output of a power factor correction (PFC) circuit; determining a first ramp voltage for a ramp signal based on the first voltage; generating the ramp signal that decreases from the first ramp voltage to a second ramp voltage; providing a pulse width modulation (PWM) signal having a first state to a control terminal of a switch of the PFC circuit; receiving a second voltage representing a current through the switch of the PFC circuit when the PWM signal is in the first state; comparing the second voltage and the ramp signal to generate a decision; responsive to the decision indicating that the second voltage intersects the ramp signal, switching the PWM signal from the first state to a second state to disable the switch; determining a duration of the PWM signal in the first state; storing, by a memory, the duration of the PWM signal in the first state; and determining the first ramp voltage of a second ramp cycle based on the duration of the PWM signal in the first state stored in the memory.

14. The method of claim 13, wherein the ramp signal decreases from the first ramp voltage to the second ramp voltage within a ramp cycle period;
wherein the PWM signal has a switching cycle period, in which the PWM signal switches from the first state to the second state; and
wherein the switching cycle period equals the ramp cycle period.

15. The method of claim 14, further comprising:
determining a duration of the PWM signal having the first state in a first switching cycle;
determining the first ramp voltage for the ramp signal of the second ramp cycle after a first ramp cycle that coincides with the first switching cycle; and
providing the ramp signal in the second ramp cycle.

16. The method of claim 15, wherein the first ramp voltage for the ramp signal of the second ramp cycle is determined based on the first voltage in the first switching cycle.

17. The method of claim 13, further comprising:
receiving a voltage error signal from a voltage control loop that regulates the first voltage based on a reference voltage; and
determining the first ramp voltage based on the voltage error signal.

18. The method of claim 13, further comprising:
receiving a third voltage from an input of the PFC circuit; and
determining the first ramp voltage based on the third voltage and a duration of a switching cycle period of the PWM signal.

19. An apparatus comprising: a power factor correction (PFC) circuit having a PFC input and a PFC output, the PFC circuit including an inductor and a switch, the inductor coupled between the PFC input and a current terminal of the switch, and the current terminal is coupled to the PFC output; a current measurement circuit coupled to the current terminal and having a current measurement output; a voltage measurement circuit coupled to the PFC output and having a voltage measurement output; and a controller having a first control input, a second control input, and a control output, the first control input coupled to the current measurement output, the second control input coupled to the voltage measurement output, and the control output coupled to a control terminal of the switch, the controller including: a ramp generation circuit having a PFC input coupled to the second control input, and a ramp output; a comparator having a comparator output and first and second comparator inputs, the first comparator input coupled to the ramp output, the second comparator input coupled to the first control input; a pulse width modulation (PWM) generation circuit having a PWM control input and a PWM output, the PWM control input coupled to the comparator output, and the PWM output coupled to the control output; and a memory having a memory input and a memory output, the memory input coupled to the comparator output.

* * * * *